US006283374B1

(12) United States Patent
Fantone et al.

(10) Patent No.: US 6,283,374 B1
(45) Date of Patent: Sep. 4, 2001

(54) SYMBOLOGY IMAGING AND READING APPARATUS AND METHOD

(75) Inventors: Stephen D. Fantone, Lynnfield; David A. Imrie, Woburn; William T. Plummer, Concord; Jon E. Van Tassell, Winthrop; Philip E. McKinley, Westford; Harry R. McKinley, Southampton, all of MA (US); Luis A. Figarella, Nashua, NH (US); Howard Stern, Greenlawn, NY (US); John H. Dowling, Nashua, NH (US); Steve Meister, Atlanta, GA (US)

(73) Assignee: Robotic Vision Systems, Inc., Canton, MA (US)

( * ) Notice: Subject to any disclaimer, the term of this patent is extended or adjusted under 35 U.S.C. 154(b) by 0 days.

(21) Appl. No.: 09/151,766

(22) Filed: Sep. 11, 1998

(51) Int. Cl.[7] .................................. G06K 7/10; G06K 9/22
(52) U.S. Cl. .................................. 235/462.45; 235/462.42
(58) Field of Search .......................... 235/472.01, 462.44, 235/462.45, 462.46, 467.41, 462.42

(56) References Cited

U.S. PATENT DOCUMENTS

| 5,796,089 | * | 8/1998 | Marom ................................. 235/472 |
| 5,801,371 | * | 9/1998 | Kahn et al. ........................... 235/472 |
| 5,801,918 | * | 9/1998 | Ahearn et al. ....................... 361/683 |
| 5,828,052 | * | 10/1998 | Reynolds et al. .................... 235/472 |
| 5,837,987 | * | 11/1998 | Koenck et al. ....................... 235/462 |
| 5,844,227 | * | 12/1998 | Schmidt et al. ..................... 235/472 |
| 5,883,375 | * | 3/1999 | Knowles et al. ..................... 235/472 |
| 5,920,060 | * | 7/1999 | Marom ............................... 235/462.2 |

* cited by examiner

Primary Examiner—Karl D. Frech
(74) Attorney, Agent, or Firm—Morris I. Pollack

(57) ABSTRACT

Diffuse "dark field" illumination and "bright field" illumination are each provided for a hand-held encoded symbology imager/reader; to be projected therefrom upon symbology disposed on a target (component part, goods, package, etc.). The imager/reader is encased in a housing ergonomically configured to be griped in more then one manner and to thus facilitate holding the imager/reader steady. The symbology to be imaged is targeted by a line that not only spots the symbology, but by extending a length commensurate with that of the symbology, indicates that the symbology is in the field of view of the imager/reader. A CCD, disposed to receive light reflected from the symbology, has its readout controlled so that only selected portions of the CCD need be analyzed for illumination and focusing purposes. To optimize imaging and decoding time, and to optimize use of power, readout from some portions of the CCD is accomplished in relatively rapid time by speeding up the readout of the CCD in some of its active area; while reverting back to a slower readout for data to be analyzed for illumination and focusing control and decoding purposes. In addition, special application of entropy principles facilitate determining the optimum focus and illumination conditions for the imager/reader.

102 Claims, 7 Drawing Sheets

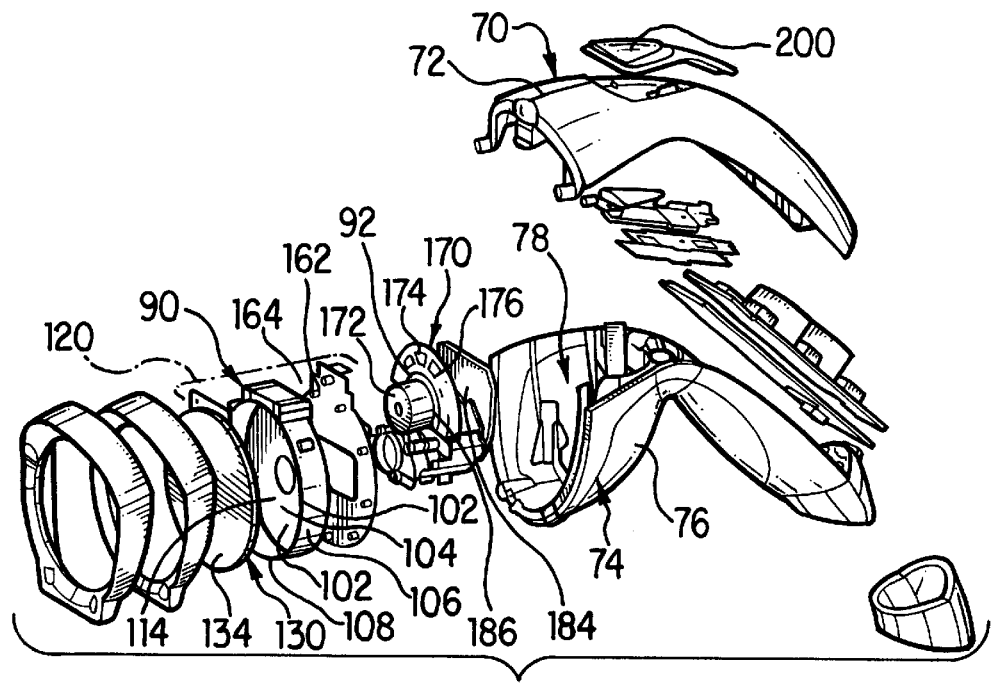
FIG.7
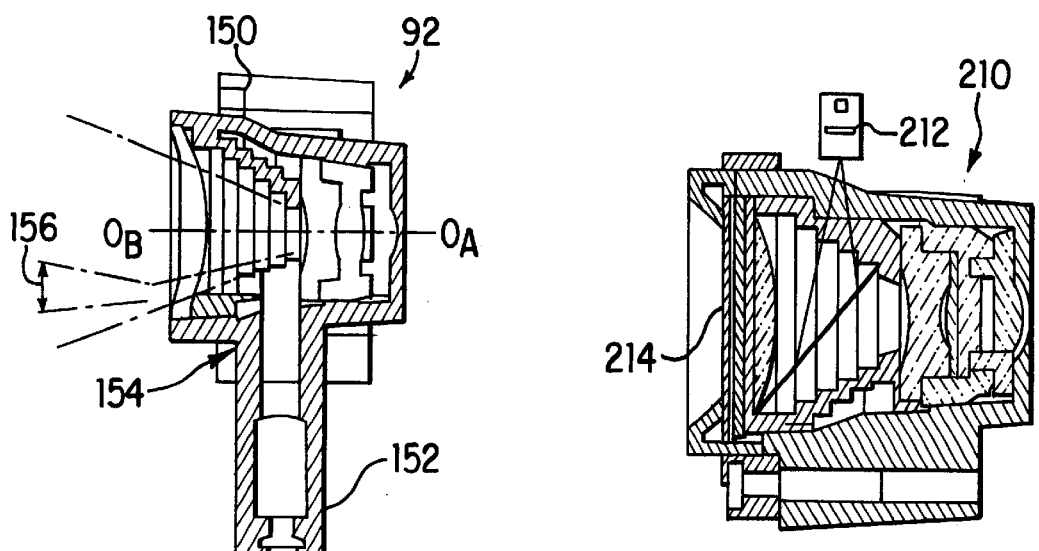
FIG.12
FIG.25

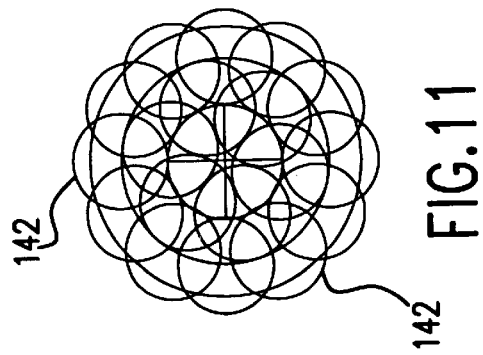
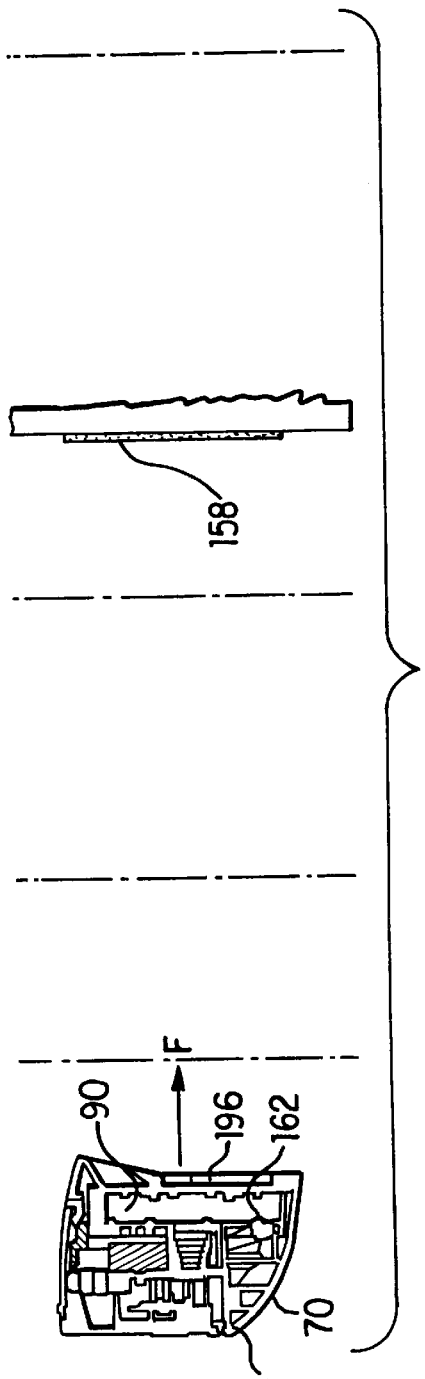
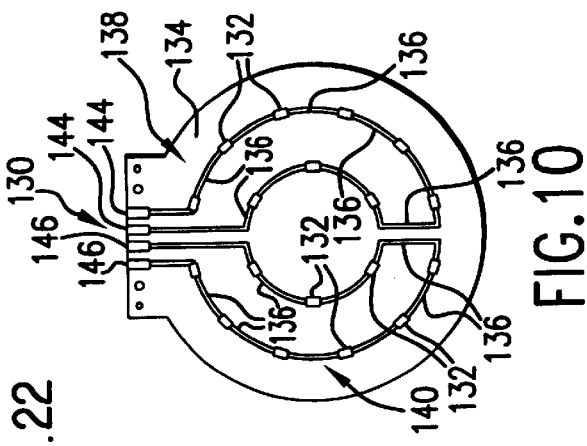
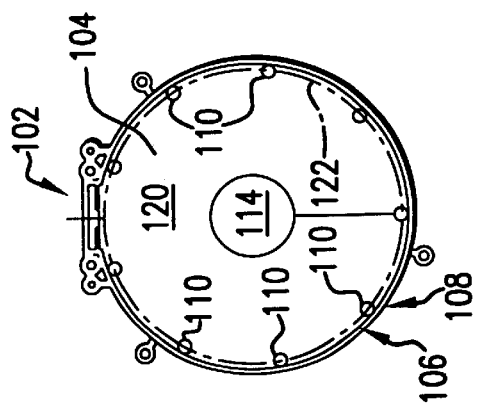
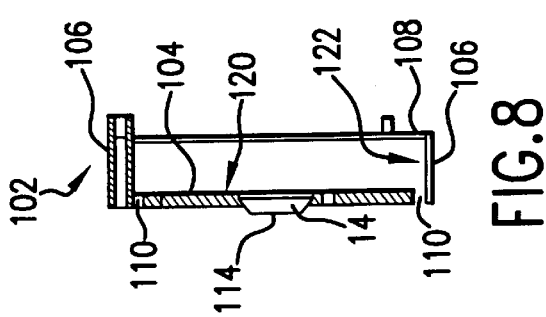

| SMIM | DIM A | OPENING |
|------|-------|---------|
| 174-1 | .0600 | 178-12 |
| 174-2 | .0856 | 178-6 |
| 174-3 | .1112 | 178-2 |
| 174-4 | .1356 | 178-8 |
| 174-5 | .1596 | 178-5 |
| 174-6 | .1832 | 178-11 |
| 174-7 | .2064 | 178-3 |
| 174-8 | .2289 | 178-9 |
| 174-9 | .2509 | 178-10 |
| 174-10 | .2726 | 178-4 |
| 174-11 | .2938 | 178-7 |
| 174-12 | .3152 | 178-1 |
FIG.19
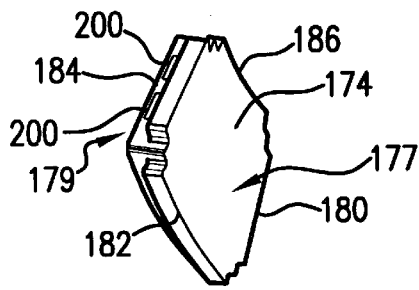
FIG.16
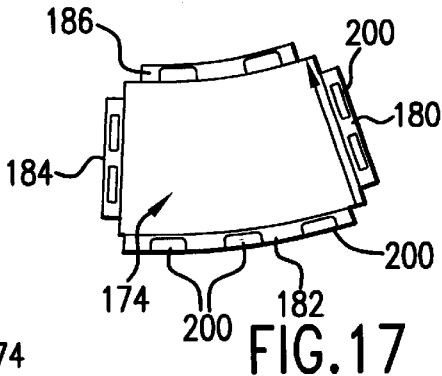
FIG.17
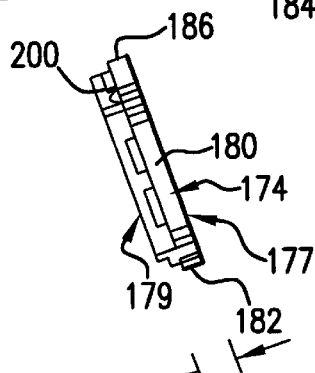
FIG.18
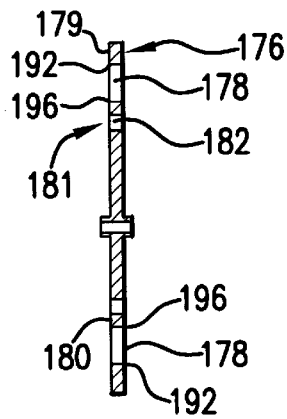
FIG.15
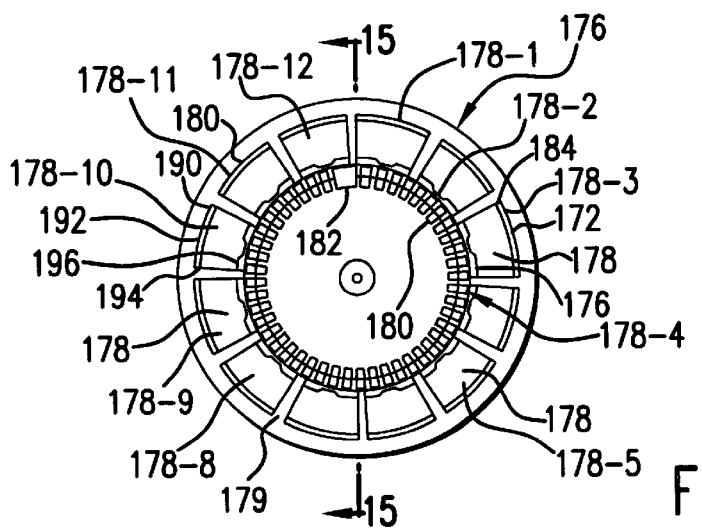
FIG.14

SYMBOLOGY IMAGING AND READING APPARATUS AND METHOD

CROSS REFERENCE TO RELATED APPLICATIONS

This application is related to and a continuation-in-part of PCT International Application Publication Number WO 97/42756, filed May 6, 1997 by Fan-Ching Tao for "Smart Progressive-Scan Charge-Coupled Device Camera" and which has an International Publication Date of Nov. 13, 1997 and which, in turn, is a continuation of U.S. Provisional Patent Application No. 60/016,949 filed May 6, 1996 by Fan-Ching Tao; both of which are assigned to an assignee of the instant patent application.

BACKGROUND OF THE INVENTION

1. Field of Use

This invention relates to imaging and reading (decoding) apparatus and methods of imaging and reading; and more particularly, to imaging and reading of encoded symbology applied, directly or indirectly, to articles and methods of effecting such imaging and the reading thereof.

2. Description of the Prior Art

More and more, modern technology requires accurate, efficient and rapid availability of things. Things to be manufactured and to be used in manufacturing processes. Things to be placed in storage and removed from storage and/or loaded for transport and unloaded after transport.

It has, therefore, become important to keep track of such things or articles as such things may otherwise be referred to. Knowledge of the existence, location and physical and other characteristics of such articles facilitates a more effective employment of such articles; especially if such knowledge is gathered and stored in a consistent and automated manner and, when required, utilized in an automated manner.

Robotic handling of parts for processing such as machining or assembly purposes and for automated sorting, transportation, manipulation and other handling of parts, components, assemblies, goods, packages, and the like usually requires that some form of machine readable code or symbology be applied to the article. The subsequent reading (decoding), collecting, interpretation and utilization of article applied machine readable codes, by devices and systems utilized for such purposes, has been found to be an effective tool of modern industry and society. U.S. Pat. No. 5,567,927 to R. W. Kahn for "Apparatus For Semi-Conductor Wafer Identification" and U.S. Pat. No. 5,631,456 to K. L. Kost for "Reflection Control Apparatus" are exemplary of such product marking. At times it is convenient to apply the symbology to a media such as a pressure sensitive label. Other times it is more desirable and possibly more efficient to apply the symbology directly to the article.

The symbology may be a conventional bar code, a stacked bar code or other 2-D symbology.

Reading of such symbologies, as by a stationary or hand-held reader or imager, requires proper and accurate imaging of the symbology which, in turn, requires proper illumination of the symbology so that an accurate image of the entire symbology is captured, stored, interpreted and utilized. Illumination and imaging of symbology quite often presents problems if the media carrying the symbology is applied to an irregular or curved surface. Such problems may be more pronounced if the symbology is applied directly to the article and if the article surface is normally specular and/or if the article's surface is irregular, and/or if the symbology is of low contrast such as one accomplished by laser etching or dot peening.

When the symbology reader or imager is to be hand-held it is usually most desirable to minimize its size and weight; as well as the time required to effectively and efficiently capture the image of the symbology. Managing and conserving the power necessary to illuminate and capture the image of the symbology and to effect other processing to be accomplished within the hand-held device is also an important factor. The configuration of the body of a hand-held imager to be grasped and held while locating and capturing the image of the symbology and the length of time required to do so is of significant importance. Movement of the imager while capturing the image may affect the ability of the device to capture the image and the accuracy of the image itself when compared to the symbology. The shorter the time required to capture the image the greater the probability that the image captured will be interpreted to correspond to the symbology.

U.S. Pat. No. 4,766,300 to G. E. Chadima. Jr., et al for "Instant Portable Bar Code Reader" and U.S. Pat. No. 5,314,372 to J. A. S. Bjorner et al for "Apparatus For the Uniform Illumination Of A Surface", show and describe symbology readers which must be positioned against the symbology in order to properly image and interpret the symbology; and thus limit the versatility of the device and possibly its acceptability. On the other hand imagers such as those shown in U.S. Pat. No. 5,430,285 to T. W. Karpen et al for "Illumination System For Optical Reader" and in U.S. Pat. No. 5,585,616 to D. L. Roxby et al for "Camera For Capturing And Decoding Machine-Readable Matrix Symbol Images Applied to Reflective Surfaces" and in U.S. Pat. No. 5,689,104 to M. Suzuki et al for "Optical Code Reader With Devices To Locate A Code In A Reading Window" may be utilized at predetermined distances from the symbology but present other characteristics and shortcomings which may render them unacceptable.

Other imagers and systems are shown and described in U.S. Pat. No. 5,702,059 to J. B. Chu et al for "Extended Working Range Dataform Reader Including Fuzzy Logic Image control Circuitry" and in U.S. Pat. No. 5,756,981 to A. R. Roustaei et al for "Optical Scanner For Reading And encoding One-And Two-Dimensional Symbologies At Variable Depths Of Field Including Memory Efficient High Speed Image Processing Means And High Accuracy Image Analysis Means"; but these imagers and systems also may be unacceptable because they may not meet the above described criteria.

SUMMARY OF THE INVENTION

It is therefore an object of this invention to provide new and novel symbology imagers.

It is another object of this invention to provide new and novel symbology imagers/readers.

It is yet another object of this invention to provide new and novel imagers/readers of encoded symbology.

It is yet still another object of this invention to provide new and novel methods for imaging and reading encoded symbology.

It is a further object of this invention to provide new and novel image illumination and co-acting image optics and electronic image receiving and interpreting apparatus for an imager/reader for encoded symbology.

It is yet a further object of this invention to provide new and novel image illumination and co-acting image optics and electronic image receiving and interpreting apparatus for a handheld imager/reader for encoded symbology.

It is still a further object of this invention to provide new and novel methods for illumination, imaging and interpreting encoded symbology.

It is yet still a further object of this invention to provide new and novel methods for illumination imaging and interpreting encoded symbology with a hand-held imager/reader.

It is yet still a further object of this invention to provide new and novel co-acting illumination, optical and electronic image capture assemblies for photonics for an imager.

It is yet still a further object of this invention to provide new and novel co-acting illumination, optical and electronic image capture assemblies for photonics for a hand-held imager/reader.

It is yet still a further object of this invention to provide new and novel co-acting diffuse illumination, optical and electronic image capture assemblies for focusing an imager.

It is yet still a further object of this invention to provide new and novel co-acting diffuse illumination, optical and electronic image capture assemblies for focusing a hand-held imager.

It is yet still a further object of this invention to provide new and novel methods for utilizing illumination, optics and electronic image capture for photonics for an imager/reader.

It is yet still a further object of this invention to provide new and novel methods for utilizing illumination, optics and electronic image capture for focusing an imager/reader.

It is yet still a further object of this invention to provide new and novel illumination, optics and image capture apparatus for a hand-held imager/reader and a new and novel housing configuration for same that facilitates gripping and holding the imager/reader for effective image capture.

It is yet still a further object of this invention to provide new and novel illumination, optics and image capture assemblies for a hand-held imager/reader in conjunction with new and novel image/reader gripping arrangements that facilitate using the hand-held imager/reader and proper utilization of mechanisms therewithin.

Other objects, features and advantages of the inventions in their methods and details of construction and arrangement of parts will be seen from the above, from the following description of the preferred embodiments, when considered with the drawings and from the appended claims.

BRIEF DESCRIPTION OF THE DRAWING

In the drawing:

FIG. 7 is an exploded diagrammatic perspective of the imager/reader of FIGS. 1,5 and 6;

FIG. 8 is a side elevational cross-sectional view of the illuminator, incorporating the instant invention, of the illumination assembly, incorporating the instant invention, of the imager/reader of FIGS. 1, and 5–7 with the illumination source removed to better show details thereof;

FIG. 9 is a front elevation view of the illuminator of FIG. 8;

FIG. 10 is a plan view of the illumination source, incorporating the instant invention, for the illuminator of FIGS. 8 and 9 and the illumination assembly of FIGS. 1 and 5–9;

FIG. 11 is a schematic diagram showing the distribution of illumination upon the illuminator of FIGS. 1 and 5–9;

FIG. 12 is a cross-sectional elevational view of the objective taking lens assembly of FIG. 5, enlarged and rotated 180 degrees about a vertical axis to better show details of the aiming and targeting mechanism incorporated therein;

FIG. 14 is a plan view of an alternative embodiment, of focusing disk carrier, incorporating the instant invention, for use with the image reader of FIGS. 1, 2, 5 and 7;

FIG. 15 is a vertical sectional view of the focusing disk carrier taken on line 15—15 of FIG. 14;

FIG. 16 is a diagrammatic perspective view of one of the focusing shims, embodying the instant invention, for the focusing disk of FIG. 14;

FIG. 17 is a plan view of the focusing shim of FIG. 16;

FIG. 18 is an end view of the focusing shim of FIGS. 16 and 17;

FIG. 19 is a table showing an example of relative thicknesses for an exemplary set of focusing shims of the configuration shown in FIGS. 16–18 for use on the carrier of FIG. 14;

FIG. 22 is a schematic of the illuminator and illumination source of the imager/reader of the instant invention disposed in relationship to a symbology target;

FIG. 25 is a cross-sectional elevational view of an alternative embodiment of objective taking lens assembly which includes an aiming and targeting mechanism, incorporating the instant invention, for use with the imager/reader of FIGS. 1-24;

DESCRIPTION OF THE PREFERRED EMBODIMENTS

Figure 1:
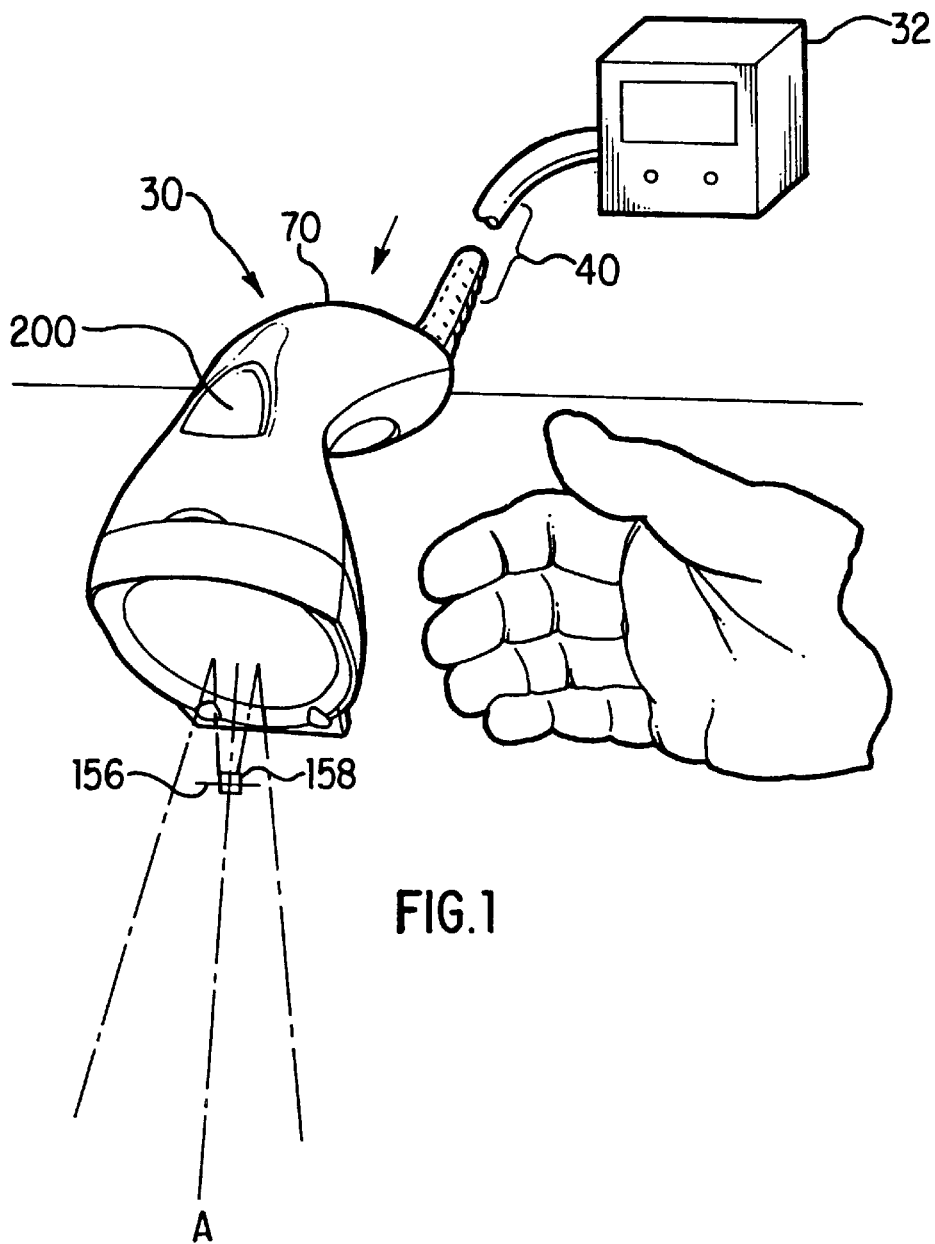
FIG. 1 is a diagrammatic perspective showing of a handheld imager/reader system, incorporating the instant invention.

With reference to FIG. 1 there is generally shown at 30 an imaging device or imager/reader of the type which electronically captures images of symbologies and converts the captured image into decoded and otherwise processed electronic signals. The signals are thereafter transmitted to a signal utilization apparatus 32 through a cable 34 for storage, and/or use for accounting, inventory, material handling, manufacturing processes, or the like. Apparatus 32 may house software for analyzing electrical imaging signals provided by imager 30 and for performing other system housekeeping tasks as, for example, exchanging signals related to ranging, power management, ambient light level, focusing, and activation of user interface signals. Components in imager 30 may also share one or more of such functions with apparatus 32. If desired, imager 30 can be operated without being physically connected with an associated apparatus 32 (i.e., without need for cable 34). This can be accomplished by incorporating a radio frequency (RF) module (not shown) into imager 30 for communication with a portable data terminal (not shown). A suitable module includes a radio frequency communication transceiver means to allow the imager 30 to transmit and receive information, (including but not limited to decoded data, images and the like) to or from another computer or network. The imager 30 can contain energy storage means (e.g., batteries) with which to power it for a suitable duration independently of external sources. While batteries and RF will usually be connected, the utilization of RF only, without batteries, is permissible as a means of reducing the need for cable connections. An alternate to an RF communication module is an on-board infrared (IR) communication module that operates via an IR link between imager 30 and an external transceiving device (not shown).

Figure 2:
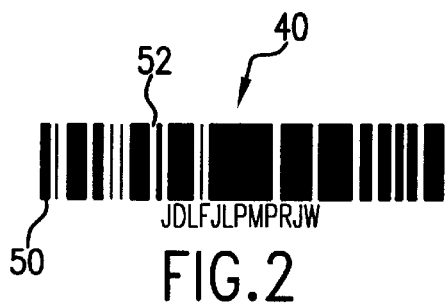
FIG. 2 is a diagrammatic plan view of a linear, or 1-D symbology, more commonly referred to as a bar code, that can be imaged by the imager/reader of FIG. 1 and read (decoded) by suitable software provided to the imager/reader of FIG. 1.
Figure 3:
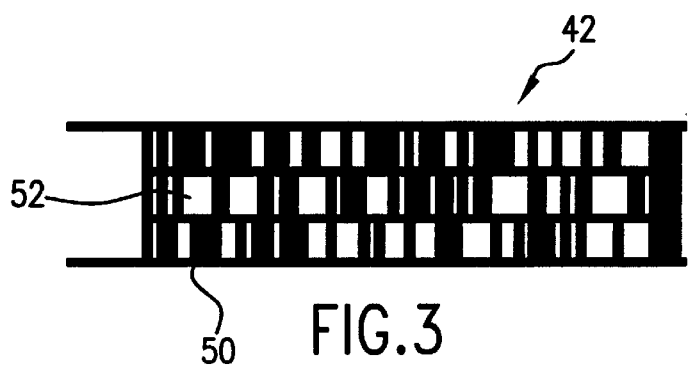
FIG. 3 is a diagrammatic plan view of a "stacked" type of symbology that can be imaged by the imager/reader of FIG. 1 and read (decoded) by suitable software provided to the imager/reader FIG. 1.
Figure 4:
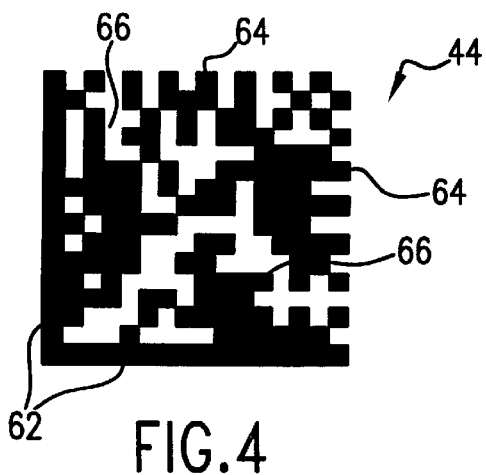
FIG. 4 is a diagrammatic plan view of a matrix, or 2-D, type of symbology that can be imaged by the imager/reader of FIG. 1 and read (decoded) by suitable software provided to the imager/reader of FIG. 1.

The symbology to be imaged includes, for example, bar codes 40(FIG. 2), stacked bar codes 42 (FIG. 3), 2-D (two dimensional) matrix type codes 44(FIG. 4), conventional human readable characters such as those used in this description, and conventional OCR characters (not shown). Bar codes 40 and stacked bar codes 42 usually employ black bars 50 and white spaces 52 and generally require a relatively large area for a relatively limited amount of information. Matrix type 2-D symbology 44 (FIG. 4)offers higher density capacity, generating smaller codes for a given feature size. Symbology 44, by way of example, includes a location section 62, a clocking section 64 and an information section 66 that is typically encoded via cell sizes of 5, 7.5, 10 or 15 mils. Because of the properties described for 2-D symbologies imager/readers need to be positioned much closer to such symbols to image the symbols then for linear bar codes or stacked bar codes. The imaging system of imager 30 is uniquely capable for imaging bar codes, stacked bar codes and matrix-type symbology over a working distance that ranges from about 1.5 inches to 16 inches as will be further explained hereinafter. Other and longer distances are possible. Imager/reader 30 will be referred to in the description that follows simply as Imager 30 to facilitate this description.

The respective mechanisms of imager 30 are disposed within a housing 70 (FIGS. 1 and 5–7) that includes a pair of housing segments 72, 74 that join together as explained in greater detail in a copending application of C. Kanojia et al., for "Multi-Modally Grippable Device and Method of Use", U.S. Ser. No. 09/151,483. As explained further in that application, and can be seen from the figures of this application, housing 70 is ergonomically configured so that it can be grasped with relative ease in at least two principal ways. One way to grip housing 70 is with a pistol-type grip; while the other grip is one wherein the hand of the user cups or encircles the forward end or portion 76 of housing 30 which is generally convex and cup-shaped. Since housing 30 is thus ergonomic in configuration there are other ways it can be gripped and thus it should be considered to be multi-modally grippable as further explained in Kanojia et al. The configuration and sizing of housing 70 is also selected to provide an internal space 78 (FIGS. 5 & 7) within which components of imager 30 are secured in position.

Principal components or assemblies of imager 30 include an illumination device or assembly 90 (FIGS. 5 & 7), a camera engine or assembly 92, an image receiver 93 (FIG. 5) and an electronic package 94 which includes at least a power PC board 96 and a CPU PC board 98; all co-acting and electrically interconnected. Illumination device 90 is described in detail in the copending application of H. Stern for "Diffuse Surface Illumination Apparatus And Methods", U.S. Ser. No. 09,151,765; while camera engine 92 is described in detail in the copending applications of J. Van Tassel et al. for "Optical Focusing Device And Method", U.S. Ser. No. 09/152,229 and for "Variable Focus Optical System", U.S. Ser. No. 09/151,496, respectively. Additional descriptions for mechanisms 90, 92, 93 and 94, especially with respect to photonics and focusing, are further described in coyending applications of J. Dowling et al. for "Optical Symbologies Imager", U.S. Ser. No. 09/151,764 and "Method Of Controlling A Charge Coupled Device In An Accelerated Mode, And In Conjunction With An Optical Symbology Imager", U.S. Ser. No. 09/151,797. Details of the construction and operation of the components and of the mechanisms of the applications referred to above are incorporated herein and made a part hereof.

Illumination device 90 (FIGS. 5 & 7) includes a substantially cup or bowl shaped illuminator 102 (FIGS. 5 & 7–9) that includes a base 104, with a perimeter wall 106 rising from base 104 at right angles thereto to terminate at a perimeter edge 108. A plurality of first- openings 110 extend through base 104 proximate wall 106. A central opening 114 extends through base 104 in alignment with the lenses of camera engine 92 as will be further explained hereinafter and as explained in said H. Stern application.

An inner surface 120 of base 104 and an inner surface 122 of wall 106 are finished (as described in the aforementioned H. Stern application) so-that a substantially lambertian output illumination pattern is effected and projected out from every point on respective surfaces 120,122 that are illuminated by an illumination source 130 (also as explained in detail in said H. Stern application).

Illumination source 130 (FIGS. 5, 7 & 10)includes an array of illumination devices, which may and preferably include unlensed LED's (light emitting diodes) 132 (FIGS. 5 & 10) mounted on an illumination device carrier 134 which is, in turn, secured in place against peripheral edge 108 of illuminator 102. Illumination carrier 134 is preferably fabricated from transparent (to the emitted LED wavelengths) material such as glass, plastic, etc. Illumination carrier 134 may have its surface coated with transparent or clear electrically conductive material or it may be provided with relatively thin electrical conductive strips of ink or wire 136 (FIG. 10) to electrically connect LED's 132 into a first circuit 138 and a second circuit 140. Other circuit arrangements are possible for the LED array.

Each unlensed LED 132 will cast a substantially lambertian or focused illumination 142 (FIG. 11)upon surfaces 120,122 of illuminator 102. The respective illumination 142 of adjacent LED's 132 will overlap, as shown in FIG. 11, and be cast in the direction of arrow R (FIG. 5)back into imager 30 and upon surfaces 120,122 to be projected in the direction of arrow F from those surfaces back through illumination carrier 134 and out from imager 30. Illumination 142, which strikes surface 122 of wall 106, will be directed back into illuminator 102 and against surface 120 of base 104 to further enhance and add efficiency to illumination 142 projected out from imager 30.

Circuit 138 terminates at electrical connectors 144 (FIG. 10) and circuit 140 terminates at electrical connectors 146; which circuits may be activated through connectors 144, 146 separately, together or in sequence from suitable conventional and appropriate sources. Such circuits may have their respective LED's 132 energized at various selected intensities and for selected time intervals as described in said H. Stern application. Illuminator 102 and illumination source 130 provide a "dark field" illumination also as described in said H. Stern application.

A plurality of "bright field" illumination devices 162 (FIGS. 5–7), which preferably include illumination devices such as lensed LED's, are carried by a "bright field" illumination carrier 164, (FIG. 7), extend through first openings 110 of illuminator 102 and together comprise a "bright field" illumination source which projects its illumination forward (in the direction of arrow F). LED's 162 are disposed and operated as more fully described in said H.Stern application.

Figure 5:
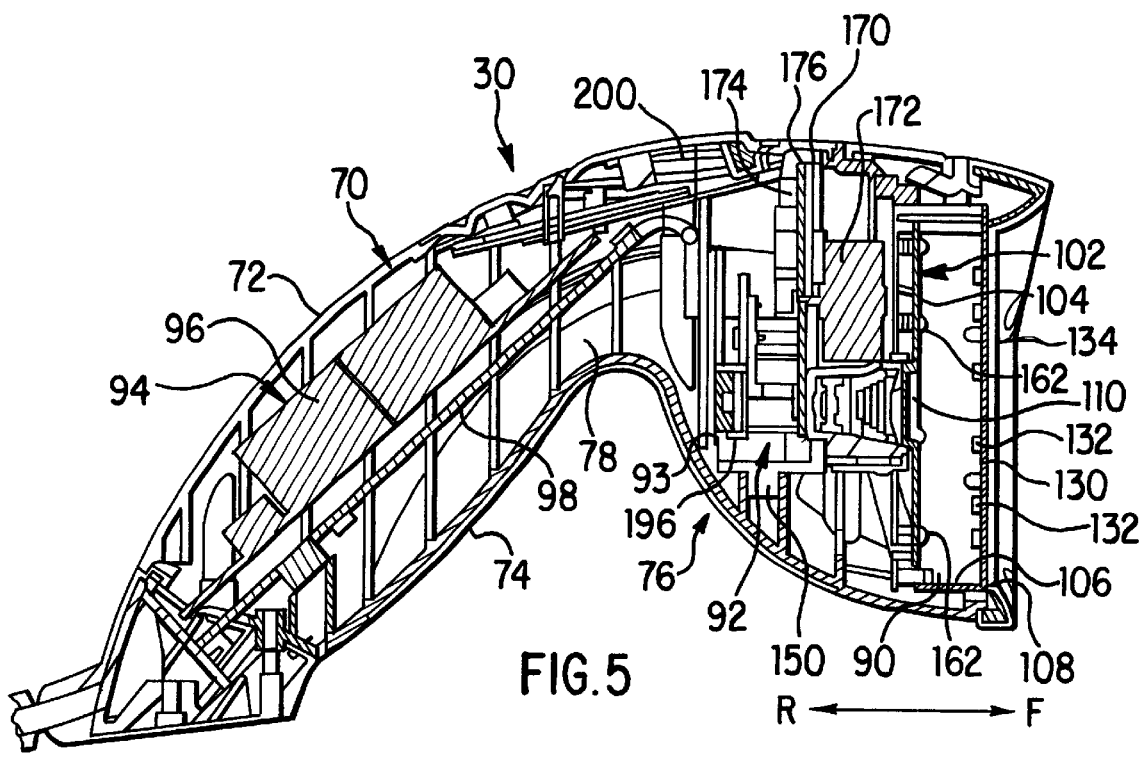
FIG. 5 is a cross-sectional elevation view of the imager/reader of FIG. 1, rotated 180 degrees about a vertical axis.
Figure 6:
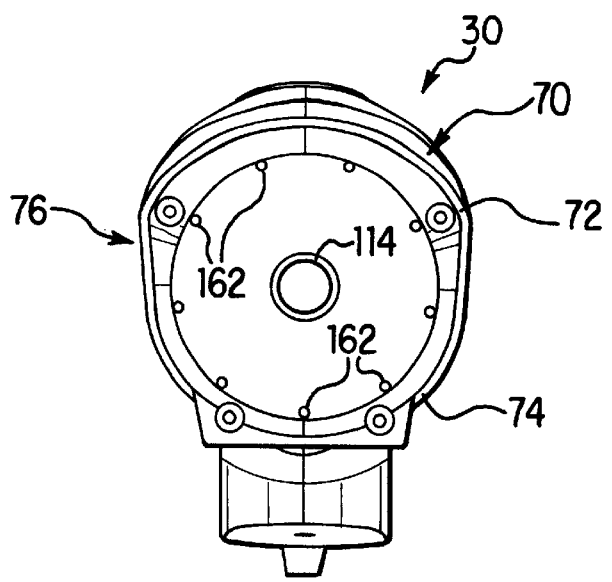
FIG. 6 is a front elevational view of the imager/reader of FIG. 1.

Camera engine 92 (FIGS. 5, 7 & 12) includes an object taking lens arrangement 150 (FIGS. 5 and 12—more specifically described in said J. Van Tassel applications) that also includes a Laser Diode 152 (FIG. 12) and pick off mirror 154 which co-act to project a targeting line 156 (FIG. 1)on a symbology target 158 to be imaged. Targeting line 156 is in a color visible to the naked eye and is projected from imager 30 so as to be coextensive with the width of the target symbology 158 to be imaged and read and by doing so indicates to the user that imager 30 is in field of view to be focused.

Figure 13:
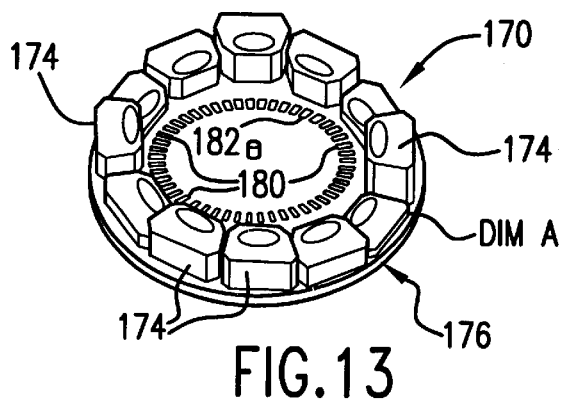
FIG. 13 is an enlarged schematic perspective view of a focusing disk, incorporating the instant invention, of the objective taking lens system of the imager/reader of FIGS. 1, and 5–7 with shims thereon exaggerated in relative size to better show details thereon

Camera engine 92 also includes a focusing disk 170 (FIGS. 5,7 and 13) that functions to facilitate-photonics and focusing of imager 30 as more fully described in said J.Van Tassel et al. and J. Dowling applications. A motor 172 (FIGS. 5 and 7) rotates focusing disk 170 about an axis of rotation that is offset from an optical axis OA for object taking lens arrangement 150 and so as to successively position optical plates or shims 174 (FIGS. 5, 7,13 and 15–17)in alignment with said optical axis OA. A shim carrier 176 (FIGS. 5, 7, and 13–15), of disk 170, is formed with shim openings 178 (FIGS. 14 & 15) distributed in a circle proximate the periphery of carrier 176. There are twelve shim openings 178 provided in carrier 176 to respectively receive twelve shims 174 arranged and for purposes described in said aforementioned applications. Each such shim 174 is fabricated from optical material and is in the configuration of a sector of a ring, as seen in FIGS. 16 and 17. A lip (FIGS. 16–18) 180,182, 184, and 186 extends respectively from each side of shim 174. Each lip 180–186 is sized and positioned to rest upon a corresponding lip (FIGS. 14 and 15) 190,192, 194 and 196 respectively formed within each shim opening 178 of carrier 176. Resilient prongs 200 (FIGS. 16–18) extend out from lips 180-186 of shims 174 to facilitate seating of shims 174 in openings 178. Shims 174 may be otherwise secured within openings 178 by adhesive or other means. It should be noted in FIG. 13 that shims 174 are of different thicknesses "DIM A" (FIG. 18). The respective thicknesses "DIM A" are selected to provide different focusing for camera engine 92 upon imaging receiver 93 as more specifically described in said J. Van Tassel and J. Dowling applications. For example one set of thicknesses (DIM A) for shims 174 is listed in the table of FIG. 19. The respective shims 174 would be secured in openings 178, for example, in the following order reading clockwise (direction of arrow C—FIG. 14) from the one o'clock position. Shim 174-12 in opening 178-1, shim 174-3 in opening 178-2, shim 174-7 in opening 178-3 and so forth according to the table of FIG. 19. Shims 174 are so arranged to balance rotating focusing disk 170. A face surface 177 of shims 174, when so seated in openings 178, will be flush with a face surface 179 of shim carrier 176 with a back surface 179 of each shim 174 extending out from a back surface 181 of carrier 176.

Figure 21:
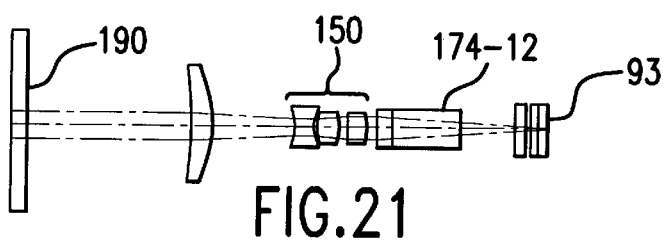
FIG. 21 is an optical layout of the lens system of the imaging system of he imager/reader of the instant invention for imaging symbology in a far focusing zone.
Figure 20:
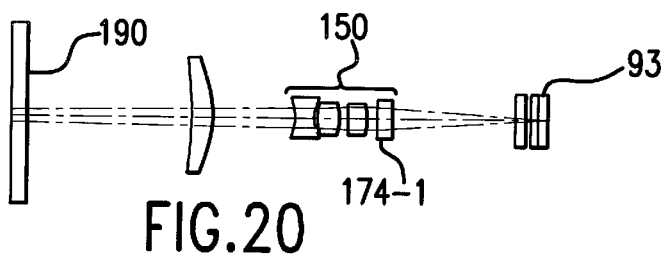
FIG. 20 is an optical layout of the lens system of the imager/reader of the instant invention for imaging symbology in a nearby focus zone.

Optical layouts for imager 30 are shown, by way of example, in FIGS. 20 and 21 wherein the object taking lens arrangement 150 is positioned between image receiver 93 and a window 190 for imager 30. FIG. 20 shows shim 174-1 in position between lens arrangement 150 and image receiver 93 representing the system configuration for extreme nearby focus. FIG. 21, on =the other hand, shows shim 174-12 in position between lens arrangement 150 and image receiver 93 representing the system configuration for the farthest focus zone.

A plurality of timing or position indicating openings 180 (FIGS. 13–15) may be either formed through shim carrier 176 in a circle within and concentric with shims 174 or imprinted on a surface of shim carrier 176. An initial position opening 182 is also formed through shim carrier 176. Openings 180, 182 are disposed to be sensed by a conventional encoder transmitter 184(FIG. 5) to provide a signal to a counter mechanism of electronic package 94 that, in turn, provides an output indicative of the position of focusing disk 170. An encoder receiver 186 is connected in circuit with electronic package 94 to provide control signals to motor 172 for focusing disk 170.

Symbology targets 158 (FIGS. 1 and 22), located between the extreme nearby focus distance for imager 30 and the start of a mid-range for imager 30 (i.e. between 1.5 to 4 inches from window 190 of imager 30—between A and B of FIG. 22) are best illuminated by "dark field" illumination device 90. Symbology targets 158 located between the farthest focus zone for imager 30 and the end of the mid-range for imager 30 (i.e. between 16 and 8 inches from window 190—between D and C of FIG. 22) are best illuminated by "bright field" illumination devices 162. Symbology targets 158 located in a mid-range from window 190 of imager 30 (i.e. between 4 and 8 inches from window 190—between B and C of FIG. 22) are best illuminated by either/or both "bright field" illumination device and "dark field" illumination device 90.

Image receiver 93, which also comprises a component of camera engine 92, could include a CCD (charge coupled device), or a CMOS (complimentary metal oxide semiconductor), or similar device for receiving an image from target symbology 158. A suitable and conventional filter package 196 is positioned within camera engine 92 proximate image receiver 93.

Figure 23:
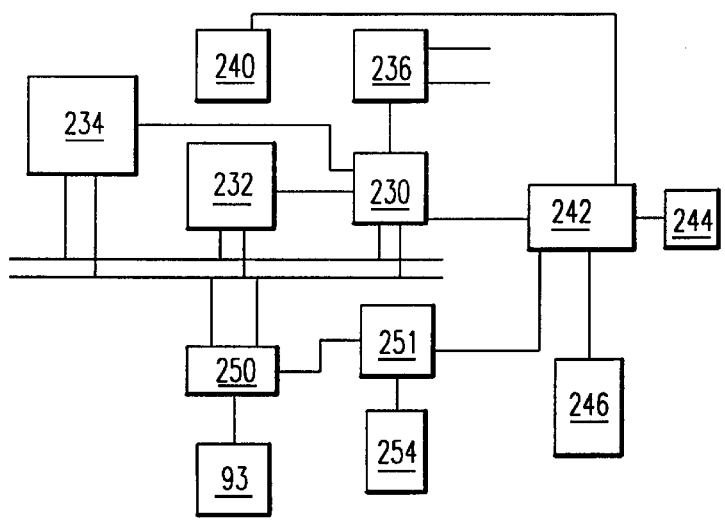
FIG. 23 is a block diagram of the electronics and controls of the imager/reader incorporating the instant invention.

The circuitry and constituent components of electronic package 94 are schematically shown in FIG. 23 and described in detail in said J. Dowling applications. In brief, a CPU 230 connects to a flash memory 232 and a DRAM 234, which together form the computing engine for the imager 30. CPU 230 further connects to a serial interface 236, which, in turn, is connected to a power supply 240. A microcontroller 242 is connected by serial link to CPU 230, and, in turn, is connected to power supply 240, switches 244, motor 246, and illumination drivers 248. Illumination drivers 248 are connected to "bright Field" and Targeting Illumination, shown as illumination 254. An FPGA 250 is connected to CPU 230, flash memory 232, DRAM 234, illumination drivers 238 and CCD 252. FPGA 250 controls the CCD and illumination 254. FPGA 250 and microcontroller 243 control targeting. Motor 246 drives focusing disk 94.

In operation imager 30 is grasped by the user in one of its multi-positions, as described in said C.Kanojia application and trigger 200 (FIGS. 1 and 5) is depressed to activate electronic package 94 of imager 30. Focusing disk 170 is set into rotation by its motor 172 and targeting line 156 is projected towards symbology target 158. When targeting line 156 is centered within symbology 158 and extends substantially the same width as that of symbology 158 the operator visually knows that at least one dimension of symbology 158 is within the field5 of-view of imager 30 and so covers the maximum number of camera pixels to achieve the highest camera resolution possible. As focusing disk 170 rotates, with symbology 158 illuminated by flash illumination under the control of the CPU, imaging receiver 93 receives successive light images reflected off of symbology 158 through lens arrangement 150 and successive shims 174 until photonics are completed for imager 30 as described in said J.Dowling et al application. Photonics is the setting of brightness and duration parameters for illumination; as well as whether "dark field", "bright field" or both illuminations are required. The setting of the photonics for imager 30, when accomplished as described in said J.Dowling et al application, may only require flash illumination through two successive shim positions and only 11 mS (milliseconds) and no more then five successive shim positions and only 27.5 mS. The innovative use of the CCD of image receiver 93 by speeding up the output signals from a first plurality of pixel rows and, in essence, dumping those signals instead of analyzing them and the subsequent slowing down and analyzing of the pixel output for a section of pixel rows proximate the center of the CCD and thereafter resetting the CCD provides an acquisition time for each shim image of 5.5 mS. One or more other sections of the CCD of image receiver 93 may be selected for analysis while the remainder of the CCD is, in effect, dumped. This innovative use of the CCD of image receiver 93 is described in detail in the J.Dowling et al application. The CCD of image receiver 93 might, for example, include a pixel array of 659×494 pixels; with the speed-up applied to the first 242 rows of pixels, the next ten rows analyzed and the last 242 rows disregarded and reset.

After the photonics have been set symbology 158 is again flash illuminated under CPU control and through the twelve shim positions and the reflected image back to image receiver 93 is analyzed as described in said J. Dowling et al application to determine the best focus position for rotating focusing disk 170 for the particular symbology 158. The amount of time required to accomplish focusing should not exceed 66 mS (i.e. 5.5 mS×12 shim positions)plus the time to rotate focusing disk 170 to the best focusing position and illuminate symbology 158 according to the photonics established as described above. The CCD of image receiver 60 is thereafter analyzed (decoded) and the result transmitted to either utilization apparatus 32 or as otherwise described above.

While in the above description the photonics is described as being accomplished before focusing it should be understood that photonics and focusing may just as well be accomplished at the same time or that the photonics might be accomplished after determining the correct focus position for the focusing disk. In appropriate conditions of illumination the photonics might be skipped altogether.

Figure 24:
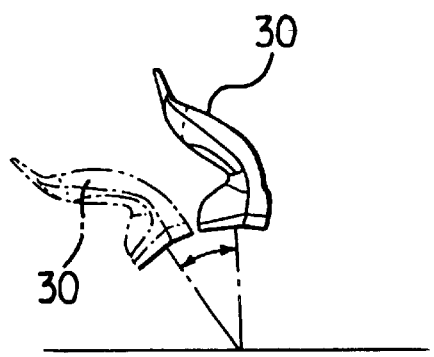
FIG. 24 is a diagrammatic elevational view of the imager/reader of the instant invention depicting it as it may be utilized when imaging symbology.

In some instances of use it may be desirable to tilt imager 30 as shown in FIG. 24 and further described in said J. Van Tassel applications.

Determining the distance to target 158 for purposes of proper illumination of target 158, and for purposes of selecting the shim for proper focusing of same, may also be accomplished by various ranging techniques; and utilized either in addition to, to supplement, or to replace, the illumination and focusing arrangements described above and in the other co-pending applications referred to herein. Ultrasonics, laser triangulation and confocal distance measuring are exemplary of techniques for these purposes.

FIG. 25 shows an alternative embodiment of object taking lens arrangement 210 wherein a targeting illumination source 212, in the form of an LED, projects targeting light upon a partially transmitting, partially reflecting beamsplitter 214 to generate a targeting line as described in said J. Van Tassel applications.

Figure 26:
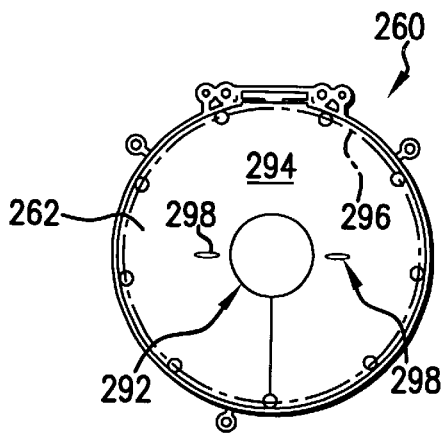
FIG. 26 is a plan view of an alternative embodiment of illuminator, incorporating the instant invention, for use with the illumination assembly of the imager/reader of the instant invention.
Figure 27:
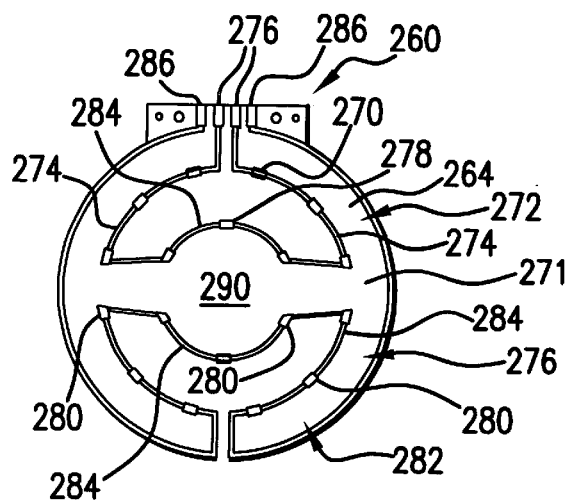
FIG. 27 is a plan view of an alternative embodiment of illumination source, incorporating the instant invention, for use with the illuminator of FIG. 26.

FIGS. 26 and 27 show an alternative configuration of illumination device 260 for imager 30 and which includes an illuminator 262 (FIG. 26) and an illumination source 264 (FIG. 27). Illuminator 262 and illumination source 264 are similar in construction interrelationship and use to illuminator 102 (FIG. 8) and illumination source 130 (FIG. 9)except that illumination source 264 includes a first array of nine unlensed LED's 270, carried by a carrier 271 and electrically interconnected into a first circuit 272 by a suitable electrically conductive substance or material, such as wires 274, which terminate at connectors 276; and a second array of nine unlensed LED's 280 carried by carrier 271 and electrically interconnected into a second circuit 282 by electrically conductive material, such as ink or wires 284, which terminate at connectors 286. A space 290 is provided between circuits 272, 282 in alignment with a central opening 292 through base 262 of illuminator 260 to facilitate passage through carrier 271 and illuminator 262 of light reflected from symbology 130 back to image receiver 93.

Inner surfaces 294, 296 of illuminator 262 are finished as described above for surfaces 120, 122 of illuminator 102 and function in the same manner as described above to provide diffuse illumination to the symbology.

A pair of elongated slots 298 extend through the base of illuminator 262 to facilitate passage through illuminator 262 of laser beams which may be utilized to target symbology in place of the targeting system described above.

From the above descriptions it will thus be seen that there has been provided new and improved imagers for imaging and decoding symbology; and new and improved targeting, illumination, photonic, and focusing mechanisms and ergonomic multi-grippable imager housing respectively for such imagers. While hand-held imagers have generally been described it will be understood that the mechanisms described and their respective operation and co-acting may just as easily be utilized with stationary disposed imagers and housed accordingly.

It is understood that although there has been shown and described preferred embodiments of the inventions that various modifications may be made in details thereof without departing from the spirit as comprehended by the following claims.

What is claimed is:

1. A hand-held data-collection apparatus for imaging machine readable symbology of coded information; comprising:
   (a) an optical illuminating head including an optically transmissive window disposed proximate a leading end portion of said head;
   (b) illumination apparatus means operable for illuminating symbology through said transmissive window; and
   (c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping or holding of said head by an operator;
   (d) said illumination apparatus means including:
      (i) illuminator means for projecting diffuse illumination in a predetermined configuration and in a predetermined direction;
      (ii) illumination means for casting illumination upon said illuminator means;
      (iii) at least a portion of a surface of said illuminator means, when illumination from said illumination means is cast thereupon, projecting said diffuse illumination in said predetermined direction.

2. The apparatus of claim 1, wherein said illumination apparatus means includes a predetermined array of illumination emitting unlensed LED's carried by said optically transmissive window and which is disposed in proximity to and for cooperation with said illuminator means and so that said illumination emitting LED's are disposed to face and cast substantially lambertian illumination upon a diffusing finish provided for said illuminator means.

3. The apparatus of claim 2, wherein said unlensed LED's are electrically connected into at least one circuit and are sized and disposed so that when said diffuse illumination is projected from said illuminator through said optically transmissive window shadows of said unlensed LED's and said electrical connectors appear smeared out in relation to symbology when brought into position to be imaged.

4. The apparatus of claim 1, wherein an exterior of said head is grippable from any position around its periphery.

5. The apparatus of claim 4, further including at least a first switch element on one of the head and the handle actuatable by a finger of an operator.

6. The hand-held data-collection apparatus of claim 1; comprising:
   (a) a two-dimensional photodetector, having an active area,-positioned at a predetermined location with respect to said optically transmissive window; and
   (b) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap.

7. The data-collection apparatus of claim 6, further including rangefinding means for determining the distance from said variable focus optical system to an object to be imaged and providing a ranging signal that varies in correspondence with object distance.

8. The data-collection apparatus of claim 6, wherein said two-dimensional photodetector is selected from the group consisting of CCD and CMOS photodetectors.

9. The hand-held data-collection apparatus of claim 8; including:
   (a) control means for controlling said focusing means and said two-dimensional photodetector to determine an optimum focus state;
   (b) said focusing means being controlled by said control means to provide image data to said two-dimensional photodetector for each of said at least two focusing zones;
   (c) said active area of said two-dimensional photodetector shifting out said image data one line at a time, and storing a central portion of said image data in a memory in said control means; and
   (d) said control means evaluating transitions between light and dark data in said central portion of said image data to produce a representative value for each of said at least two focusing zones, wherein a largest representative value indicates which of said focusing zones provides the best focus.

10. The data-collection apparatus of claim 9, wherein said CCD has a resolution of 659 by 494 in said active area.

11. The data-collection apparatus of claim 6, wherein said focusing means comprises a plurality of focusing shims of different thickness to change the optical path length of said objective taking lens so that objects positioned at different locations within the field of view of said variable focus optical system will be acceptably imaged on said active area of said two-dimensional photodetector.

12. The data-collection apparatus of claim 6, wherein said focusing means comprises a pair of helical surfaces that rotate relative to one another such that their combined optical thickness continuously varies with relative rotation of said helical surfaces to change the optical path length of said objective taking lens so that objects positioned at different locations within the field of view of said variable focus optical system will be acceptably imaged on said active area of said two-dimensional photodetector.

13. The data-collection apparatus of claim 6, wherein said focusing means comprises at least one pair of quintic focusing plates that rotate relative to one another such that in combination said quintic plates continuously vary in optical power with relative rotation thereof to focus said objective taking lens so that objects positioned at different locations within the field of view of said variable focus optical system will be acceptably imaged on said active area of said two-dimensional photodetector.

14. The data-collection apparatus of claim 6, further including means for projecting a line image of a light through predetermined elements of said objective taking lens such that said line image is aligned substantially along the optical axis of said objecting taking lens and is of substantially the same width as the symbology target, to provide a visual target for aligning an object within the field of view of said objective taking lens and said two-dimensional photodetector so that an image of the object can be captured on said two-dimensional photodetector.

15. The data-collection apparatus of claim 6, wherein said focusing element is a rotatable disc.

16. The apparatus of claim 1, wherein an exterior of said head is grippable from any position around its periphery.

17. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a plurality of substantially lambertian illumination emitting devices within said head and into an array so that each such device, when energized, will cast its illumination in a predetermined direction; and (d) providing an illuminator with at least a first diffusing surface and positioning said illuminator so that said light diffusing surface receives illumination from said illumination emitting devices and projects diffuse light along a predetermined light path and in a second predetermined direction opposite to said first predetermined direction and to be toward where a target might be positioned for imaging.

18. The method of claim 17, including selecting said illumination emitting devices of a predetermined size and electrically interconnecting said illumination emitting devices with electrically conductive material of predetermined size and positioning said illuminating emitting devices and electrically conductive material to minimize shadows upon a target and/or so that shadows thereof on a target will be out of focus and appear to be smeared when imaged.

19. The method of claim 18; including:

(a) providing within the hand-held imager/reader an objective taking lens, a two-dimensional photodetector having an active area and a rotatable focusing element;

(b) positioning said photodetector behind the objective taking lens by a predetermined distance;

(c) aiming the imager/reader so that the symbology is located within a field of view of said objective taking lens and said two-dimensional photodetector;

(d) selectively rotating said focusing element such that said focusing element moves transversely with respect to said optical axis of said objective taking lens to continuously change the focus of said objective taking lens between at least two focusing zones so that said objective taking lens can image both linear and matrix symbologies over working distances that at least partially overlap with respect to linear and matrix symbologies;

(e) forming a series of images of the symbology via the objective taking lens, onto said two-dimensional photodetector as the focusing element rotates and determining the range separating said objective taking lens and the symbology;

(f) determining a best focusing zone of said focusing element that most sharply images the symbology in accordance with the range determined as said focusing element rotates; and (g) capturing an image of the symbology with said two-dimensional photodetector when said best focusing zone of said focusing element is in alignment with said objective taking lens.

20. The method of claim 19 wherein said step of aiming the imager/reader at the symbology comprises projecting a line image of a light source through said objective taking lens substantially along the optical axis thereof to provide a visual indication to permit the line image to be placed over the symbology such that it is within the field of view of the objective taking lens and two-dimensional photodetector.

21. The method of claim 20, wherein said focusing element is selected from a group consisting of disks comprising optical shims, helical surfaces, and analytic function elements.

22. The method of claim 21, further including determining the level of available illumination and providing an artificial source of illumination that is diffuse where symbologies are near and partially diffuse where distant with respect to said objective taking lens.

23. The method of claim 19; including:

(a) providing multiple illumination conditions of said symbology;

(b) capturing an image of said symbology in said active area of said two-dimensional photodetector for each of said multiple illumination conditions;

(c) determining optimum illumination by calculating edge totals for each image data received by said two-dimensional photodetector;

(d) comprising said edge total for all of said multiple illumination conditions to determine a largest edge total, and (e) utilizing said largest edge total as an indicator of optimum illumination.

24. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window; and (c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(d) a two-dimensional photodetector, having an active area, positioned at a predetermined location with respect to said optically transmissive window; and (e) a variable focus optical system including an objective taking lens positioned with respect to said two-dimensional photodetector to image a symbology target onto said active area thereof, said objective taking lens including one or more stationary lens elements fixedly aligned along an optical axis and at least a focusing means that is rotatable about an axis offset with respect to said optical axis, said focusing means including at least two focusing zones and being moveable transversely with respect to said optical axis, to change the focus of said objective taking lens, as said focusing means rotates for selected periods, including between at least said two focusing zones, so that said objective taking lens can image over working distances that at least partially overlap.

25. The apparatus of claim 24, further including at least a first switch element on one of the head and the handle actuatable by a finger of an operator.

26. The data-collection apparatus of claim 24, further including targeting means for determining the distance from said variable focus optical system to an object to be imaged and providing a ranging signal that varies in correspondence with object distance.

27. The data-collection apparatus of claim 26, wherein said two-dimensional photodetector is selected from the group consisting of CCD and CMOS photodetectors.

28. The hand-held data-collection apparatus of claim 27; including:
(a) control means for controlling said focusing means and said two-dimensional photodetector to determine an optimum focus state;
(b) said focusing means being controlled by said control means to provide image data to said two-dimensional photodetector for each of said at least two focusing zones;
(c) said active area of said two-dimensional photodetector shifting out said image data one line at a time, and storing a central portion of said image data in a memory in said control means; and
(d) said control means evaluating transitions between light and dark data in said central portion of said image data to produce a representative value for each of said at least two focusing zones, wherein a largest representative value indicates which of said focusing zones provides the best focus.

29. The data-collection apparatus of claim 28, wherein said CCD has a resolution of 659 by 494 in said active area.

30. The data-collection apparatus of claim 24, wherein said focusing means comprises a plurality of focusing shims of different thickness to change the optical path length of said objective taking lens so that objects positioned at different locations within the field of view of said variable focus optical system will be acceptably imaged on said active area of said two-dimensional photodetector.

31. The data-collection apparatus of claim 24, wherein said focusing means comprises a pair of helical surfaces that rotate relative to one another such that their combined optical thickness continuously varies with relative rotation of said helical surfaces to change the optical path length of said objective taking lens so that objects positioned at different locations within the field of view of said variable focus optical system will be acceptably imaged on said active area of said two-dimensional photodetector.

32. The data-collection apparatus of claim 24, wherein said focusing means comprises at least one pair of quintic focusing plates that rotate relative to one another such that in combination said quintic plates continuously vary in optical power with relative rotation thereof to focus said objective taking lens so that objects positioned at different locations within the field of view of said variable focus optical system will be acceptably imaged on said active area of said two-dimensional photodetector.

33. The data-collection apparatus of claim 24, further including means for projecting a line image of a light through predetermined elements of said objective taking lens such that said line image is aligned substantially along the optical axis of said objecting taking lens and is of substantially the same width as the symbology target, to provide a visual target for aligning an object within the field of view of said objective taking lens and said two-dimensional photodetector so that an image of the object can be captured on said two-dimensional photodetector.

34. The data-collection apparatus of claim 24, wherein said focusing element is a rotatable disc.

35. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;
(b) providing said head with a leading end portion and an exterior configuration sized and shaped to facilitate cupping and holding said head by an operator in a second gripping mode;
(c) arranging a substantially lambertian illumination emitting device within said head so that such devices, when energized, will cast diffuse illumination towards and upon the symbology;
(d) providing, within the hand-held imager/reader, an objective taking lens, a two-dimensional photodetector having an active area and a rotatable focusing element;
(e) positioning said photodetector behind the objective taking lens by a predetermined distance;
(f) aiming the imager/reader so that the symbology is located within a field of view of said objective taking lens and said two-dimensional photodetector;
(g) selectively rotating said focusing element such that said focusing element moves transversely with respect to said optical axis of said objective taking lens to change the focus of said objective taking lens between at least two focusing zones so that said objective taking lens can image both linear and matrix symbplogies over working distances that at least partially overlap with respect to linear and matrix symbologies;
(h) forming a series of images of the symbology via the objective taking lens, onto said two-dimensional photodetector as the focusing element rotates and determining the range separating said objective taking lens and the symbology;
(i) determining a best focusing zone of said focusing element that most sharply images the symbology in accordance with the range determined as said focusing element rotates; and
(j) capturing an image of the symbology with said two-dimensional photodetector when said best focusing zone of said focusing element is in alignment with said objective taking lens.

36. The method of claim 35, wherein said step of aiming the imager/reader at the symbology comprises projecting a line image of a light source through said objective taking lens substantially along the optical axis thereof to provide a visual indication to permit the line image to be placed over the symbology such that it is within the field of view of the objective taking lens and two-dimensional photodetector.

37. The method of claim 35; including:
(a) providing multiple illumination conditions of said symbology;
(b) capturing an image of said symbology in said active area of said two-dimensional photodetector for each of said multiple illumination conditions;
(c) determining optimum illumination by calculating edge totals for each image data received by said two-dimensional photodetector;
(d) comparing said edge total for all of said multiple illumination conditions to determine a largest edge total, and
(e) utilizing said largest edge total as an indicator of optimum illumination.

38. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window; and (c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(d) a two-dimensional photodetector having an active area, positioned at a predetermined location with respect to said optically transmissive window;

(e) focusing means having a plurality of focusing zones, control means for controlling said focusing means and said two-dimensional photodetector to determine an optimum focus state;

(f) said focusing means being controlled by said control means to provide image data to said two-dimensional photodetector for each of said at least two of said plurality of focusing zones;

(g) said active area of said two-dimensional photodetector shifting out said image data one line at a time, and storing a central portion of said image data in a memory in said control means; and (h) said control means evaluating transitions between light and dark data in said central portion of said image data to produce a representative value for each of said at least two focusing zones, wherein a largest representative value indicates which of said focusing zones provides the best focus.

39. The apparatus of claim 38, wherein an exterior of said head is grippable from any position around its periphery.

40. The apparatus of claim 38, further including at least a first switch element on one of the head and the handle actuatable by a finger of an operator.

41. The data-collection apparatus of claim 38, further including rangefinding means for determining the distance from said variable focus optical system to an object to be imaged and providing a ranging signal that varies in correspondence with object distance.

42. The data-collection apparatus of claim 38, wherein said two-dimensional photodetector is selected from the group consisting of CCD and CMOS photodetectors.

43. The data-collection apparatus of claim 42, wherein said CCD has a resolution of 659 by 494 pixels in said active area.

44. The data-collection apparatus of claim 38, wherein said focusing means comprises a plurality of focusing shims of different thickness to change the optical path length of said objective taking lens so that objects positioned at different locations within the field of view of said variable focus optical system will be acceptably imaged on said active area of said two-dimensional photodetector.

45. The data-collection apparatus of claim 38, wherein said focusing means comprises a pair of helical surfaces that rotate relative to one another such that their combined optical thickness continuously varies with relative rotation of said helical surfaces to change the optical path length of said objective taking lens so that objects positioned at different locations within the field of view of said variable focus optical system will be acceptably imaged on said active area of said two-dimensional photodetector.

46. The data-collection apparatus of claim 38, wherein said focusing means comprises at least one pair of quintic focusing plates that rotate relative to one another such that in combination said quintic plates continuously vary in optical power with relative rotation thereof to focus said objective taking lens so that objects positioned at different locations within the field of view of said variable focus optical system will be acceptably imaged on said active area of said two-dimensional photodetector.

47. The data-collection apparatus of claim 38, further including means for projecting a line image of a light through predetermined elements of said objective taking lens such that said line image is aligned substantially along the optical axis of said objecting taking lens and is of substantially the same width as the symbology target, to provide a visual target for aligning an object within the field of view of said objective taking lens and said two-dimensional photodetector so that an image of the object can be captured on said two-dimensional photodetector.

48. The data-collection apparatus of claim 38, wherein said focusing means is a rotatable disc.

49. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a substantially lambertian illumination emitting device within said head so that such device, when energized, will cast its illumination in a predetermined direction; and (d) providing within the hand-held imager/reader an objective taking lens, a two-dimensional photodetector having an active area and a rotatable focusing element having at least two focusing zones;

(e) positioning said photodetector behind the objective taking lens by a predetermined distance;

(f) aiming the imager/reader so that the symbology to be imaged is located within a field of view of said objective taking lens and said two-dimensional photodetector;

(g) selectively rotating said focusing element such that said at least a portion of said focusing element moves transversely with respect to said optical axis of said objective taking lens and changes the focus of said objective taking lens between at least said two focusing zones;

(h) providing multiple illumination conditions of said symbology;

(i) capturing an image of said symbology in said active area of said two-dimensional photodetector for each of said multiple illumination conditions;

(j) determining optimum illumination by calculating edge totals for each image data received by said two-dimensional photodetector;

(k) comprising said edge totals for all of said multiple illumination conditions to determine a largest edge total, and (l) utilizing said largest edge total as an indicator of optimum illumination.

50. The method of claim 49, wherein said step of aiming the imager/reader at the symbology comprises projecting a line image of a light source through said objective taking lens substantially along the optical axis thereof to provide a visual indication to permit the line image to be placed over the symbology such that it is within the field of view of the objective taking lens and two-dimensional photodetector.

51. The method of claim 49, wherein said focusing element is selected from a group consisting of disks comprising optical shims, helical surfaces, and analytic function elements.

52. A hand-held data-collection apparatus for imaging machine readable symbology of coded information; comprising:
    (a) an optical illuminating head including an optically transmissive window disposed proximate a leading end portion of said head;
    (b) illumination apparatus means operable for illuminating symbology through said transmissive window; and
    (c) said illumination apparatus means including:
        (i) illuminator means for projecting diffuse illumination in a predetermined Configuration and in a predetermined direction;
        (ii) illumination means for casting illumination upon said illuminator means;
        (iii) at least a portion of a surface of said illuminator means, when illumination from said illumination means is cast thereupon, projecting said diffuse illumination in said predetermined direction;
    (d) a two-dimensional photodetector, having an active aria, positioned at a predetermined location with respect to said optically transmissive window; and
    (e) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap.

53. The apparatus of claim 52, wherein said illumination apparatus means includes a predetermined array of illumination emitting unlensed LED's carried by said optically transmissive window and which is disposed in proximity to and for cooperation with said illuminator means and so that said illumination emitting LED's are disposed to face and cast substantially lambertian illumination upon a diffusing finish provided for said illuminator means.

54. The apparatus of claim 53, wherein said unlensed LED's are electrically connected into at least one circuit and are sized and disposed so that when said diffuse illumination is projected from said illuminator through said optically transmissive window shadows of said unlensed LED's and said electrical connectors appear smeared out in relation to symbology when brought into position to be imaged.

55. The data-collection apparatus of claim 52, further including rangefinding means for determining the distance from said variable focus optical system to an object to be imaged and providing a ranging signal that varies in correspondence with object distance.

56. The data-collection apparatus of claim 52, wherein said two-dimensional photodetector is selected from the group consisting of CCD and CMOS photodetectors.

57. The data-collection apparatus of claim 52, wherein said focusing means comprises a plurality of focusing shims of different thickness to change the optical path length of said objective taking lens so that objects positioned at different locations within the field of view of said variable focus optical system will be acceptably imaged on said active area of said two-dimensional photodetector.

58. The data-collection apparatus of claim 52, wherein said focusing means comprises a pair of helical surfaces that rotate relative to one another such that their combined optical thickness continuously varies with relative rotation of said helical surfaces to change the optical path length of said objective taking lens so that objects positioned at different locations within the field of view of said variable focus optical system will be acceptably imaged on said active area of said two-dimensional photodetector.

59. The data-collection apparatus of claim 52, wherein said focusing means comprises at least one pair of quintic focusing plates that rotate relative to one another such that in combination said quintic plates continuously vary in optical power with relative rotation thereof to focus said objective taking lens so that objects positioned at different locations within the field of view of said variable focus optical system will be acceptably imaged on said active area of said two-dimensional photodetector.

60. The data-collection apparatus of claim 52, further including means for projecting a line image of a light through predetermined elements of said objective taking lens such that said line image is aligned substantially along the optical axis of said objecting taking lens and is of substantially the same width as the symbology target, to provide a visual target for aligning an object within the field of view of said objective taking lens and said two-dimensional photodetector so that an image of the object can be captured on said two-dimensional photodetector.

61. The hand held data-collection apparatus of claim 60, wherein said focusing element is a rotatable disc.

62. The hand-held data-collection apparatus of claim 77; including:
    (a) control means for controlling said focusing means and said two-dimensional photodetector to determine an optimum focus state;
    (b) said focusing means being controlled by said control means to provide image data to said two-dimensional photodetector for each of said at least two focusing zones;
    (c) said active area of said two-dimensional photodetector shifting out said image data one line at a time, and storing a selected portion, or selected portions, of said image data in a memory in said control means; and
    (d) said control means evaluating transitions between light and dark data in said selected portion or portions of said image data to produce a representative value for each of said at least two focusing zones, wherein a largest representative value indicates which of said focusing zones provides the best focus.

63. The data-collection apparatus of claim 62, wherein said CCD has a resolution of 659 by 494 in said active area.

64. The data-collection apparatus of claim 63, wherein said CCD is controlled to quickly pass 246 lines of data through without storing said 246 lines in memory, and said control portion of said image includes substantially ten lines of data for which said CCD is controlled to analyze at a rate slower than the rate at which said 246 lines were passed; said CCD being thereafter controlled to be reset.

65. A method of manipulating a hand-held imager/reader for imaging machine readable encoded symbology; comprising:

(a) arranging a plurality of substantially liambertian illumination emitting devices within said head and into an array so that each such device, when energized, will cast its illumination in a predetermined direction; and (b) providing an illuminator with at least a first diffusing surface-and positioning said illuminator so that said light diffusing surface receives illumination from said illumination emitting devices and projects diffuse light along a predetermined light path and in a second predetermined direction opposite to said first predetermined direction and to be toward where a target might be positioned for imaging;

(c) providing within the hand-held imager/reader an objective taking lens, a two-dimensional photodetector having an active area and a rotatable focusing element;

(d) positioning said photodetector behind the objective taking lens by a predetermined distance;

(e) aiming the imager/reader so that the symbology is located within a field of view of said objective taking lens and said two-dimensional photodetector;

(f) selectively rotating said focusing element such that said focusing element moves transversely with respect to said optical axis of said objective taking lens to continuously change the focus of said objective taking, lens between at least two focusing zones so that said objective taking lens can image both linear and matrix symbologies over working distances that at least partially overlap with respect to linear and matrix symbologies;

(g) forming a series of images of the symbology via the objective taking lens, onto said two-dimensional photodetector as the focusing element rotates and determining the range separating said objective taking lens and the symbology;

(h) determining a best focusing zone of said focusing element that most sharply images the symbology in accordance with the range determined as said focusing element rotates; and (i) capturing an image of the symbology with said two-dimensional photodetector when said best focusing zone of said focusing element is in alignment with said objective taking lens.

66. The method of claim 65, including selecting said illumination emitting devices of a predetermined size and electrically interconnecting said illumination emitting devices with electrically conductive material of predetermined size and positioning said illuminating emitting devices and electrically conductive material to minimize shadows upon a target and/or so that shadows thereof on a target will be out of focus and appear to be smeared when imaged.

67. The method of claim 66; including:

(a) providing multiple illumination conditions of said symbology;

(b) capturing an image of said symbology in said active area of said two-dimensional photodetector for each of said multiple illumination conditions;

(c) determining optimum illumination by calculating edge totals for each image data received by said two-dimensional photodetector;

(d) comprising said edge total for all of said multiple illumination conditions to determine a largest edge total, and (e) utilizing said largest edge total as an indicator of optimum illumination.

68. The method of claim 65, wherein said step of aiming the imager/reader at the symbology comprises projecting a line image of a light source through said objective taking lens substantially along the optical axis thereof to provide a visual indication to permit the line image to be placed over the symbology such that it is within the field of view of the objective taking lens and two-dimensional photodetector.

69. The method of claim 68, wherein said focusing element is selected from a group consisting of disks comprising optical shims, helical surfaces, and analytic function elements.

70. The method of claim 69, further including determining the level of available illumination and providing an artificial source of illumination that is diffuse where symbologies are near and partially diffuse where distant with respect to said objective taking lens.

71. A data-collection apparatus for imaging machine readable symbology of coded information, comprising;

(a) a housing;

(b) an optically transmissive window carried by said housing;

(c) illuminating apparatus disposed within said housing and positioned therein to project diffuse illumination through said window and towards symbology when disposed within the vicinity of said window;

(d) a two-dimensional photodetector, having an active area, positioned at a predetermined location with respect to said window; and (e) a variable focus optical system having an optical axis and including a focusing means that is rotatable about a focusing axis that is offset with respect to said optical axis and movable transversely, with respect to said optical axis, to change the focus of said variable focus optical system as said focusing means rotates for selected periods between at least two focusing zones of said focusing means, so that said variable focus optical system can image the symbology over predetermined working distances.

72. The data-collection apparatus of claim 71 wherein said working distance is between 1.5 inches and 16 inches.

73. The data-collection apparatus of claim 71; wherein said focusing means includes a plurality of optical plates, each of different thickness, to change the optical path length of said variable focus optical system so that symbology positioned at different locations within the field of view of said variable focus optical system will be acceptably imaged on said active area of said two-dimensional photodetector.

74. The data-collection apparatus of claim 93, including:

(a) control means for controlling said focusing means and said two-dimensional photodetector to determine an optimum focus;

(b) said control means controlling said focusing means to provide image data to said two-dimensional photodetector for each of said at least two focusing zones;

(c) said active area of said two-dimensional photodetector shifting out said image data one line at a time, and storing a selected portion of said image data in a memory in said control means; and (d) said control means evaluating transitions between light and dark data in said selected portion of said image data for, producing a representative value for each of said at least two focusing zones, wherein a largest representation value indicates which of said focusing zones provides the best focus.

75. The data-collection apparatus of claim 74 wherein said two-dimensional photodetector is a CCD with a resolution of 659 lines by 494 in said active area.

76. The data-collection apparatus of claim 71, wherein said two-dimensional photodetector receives said image data for multiple different illumination conditions and said control means calculates the optimum illumination for each symbology.

77. The data-collection apparatus of claim 71, including targeting means providing a visual indication that the symbology is within the field-of-view of the two-dimensional photodetector.

78. The data-collection apparatus of claim 71, including ranging means carried by said housing for determining when a symbol is within range to be imaged.

79. A hand-held data-collection apparatus for imaging machine readable symbology of coded information; comprising:
(a) an optical illuminating head including an optically transmissive window disposed proximate a leading end portion of said head;
(b) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;
(c) illumination apparatus means operable for illuminating symbology through said transmissive window;
(d) said illumination apparatus means including:
   (i) illuminator means for projecting diffuse illumination in a predetermined configuration and in a predetermined direction;
   (ii) illumination means for casting illumi-nation upon said illuminator means;
   (iii) at least a portion of a surface of said illuminator means, when illumination from said illumination means is cast thereupon, projecting said diffuse illumination in said predetermined direction;
(e) a two-dimensional photodetector selected from the group consisting of CCD and CMOS photodetectors; having an active area, positioned at a predetermined location with respect to said optically transmissive window;
(f) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap; and
(g) control means for controlling said focusing means and said two-dimensional photodetector to determine an optimum focus state;
(h) said focusing means being controlled by said control means to provide image data to said two-dimensional photodetector for each of said at least two focusing zones;
(i) said active area of said two-dimensional photodetector shifting out said image data one line at a time, and storing a central portion of said image data in a memory in said control means; and
(j) said control means evaluating transitions between light and dark data in said central portion of said image data to produce a representative value for each of said at least two focusing zones, wherein a largest representative value indicates which of said focusing zones provides the best focus;
(k) said two-dimensional photodetector having a resolution of 659 by 494 pixels in said active area and being controlled to quickly pass 246 lines of data through without storing said 246 lines in memory, and said control portion of said imager including substantially ten lines of data for which said two-dimensional photodetector is controlled to analyze at a rate slower than the rate at which said 246 lines were passed; said two-dimensional photo-detector being thereafter controlled to be reset.

80. A hand-held data-collection apparatus for imaging machine readable symbology of coded information; comprising:
(a) an optical illuminating head including an optically transmissive window disposed proximate a leading end portion of said head;
(b) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;
(c) illumination apparatus means operable for illuminating symbology through said transmissive window;
(d) said illumination apparatus means including:
   (i) illuminator means for projecting diffuse illumination in a predetermined configuration and in a predetermined direction;
   (ii) illumination means for casting illumi-nation upon said illuminator means;
   (iii) at least a portion of a surface of said illuminator means, when illumination from said illumination means is cast thereupon, projecting said diffuse illumination in said predetermined direction;
(e) a two-dimensional photodetector selected from the group consisting of CCD and CMOS photodetectors; having an active area, positioned at a predetermined location with respect to said optically transmissive window;
(f) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that -said objective taking lens can image over working distances that at least partially overlap; and
(g) control means for controlling said focusing means and said two-dimensional photodetector to determine an optimum focus state;

(h) said focusing means being controlled by said control means to provide image data to said two-dimensional photodetector for each of said at least two focusing zones;

(i) said active area of said two-dimensional photodetector shifting out said image data one line at a time, and storing a central portion of said image data in a memory in said control means; and (j) said control means evaluating transitions between light and dark data in said central portion of said image data to produce a representative value for each of said at least two focusing zones, wherein a largest representative value indicates which of said focusing zones provides the best focus;

(k) said two-dimensional photodetector being such as to receive said image data for multiple illumination conditions, as provided by said illumination means, said control means calculating edge totals for each image with optimum illumination being determined for the one of said multiple illumination states having the largest edge total.

81. A hand-held data-collection apparatus for imaging machine readable symbology of coded information; comprising:

(a) an optical illuminating head including an optically transmissive window disposed proximate a leading end portion of said head;

(b) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(c) illumination apparatus means operable for illuminating symbology through said transmissive window;

(d) said illumination apparatus means including:

(i) illuminator means for projecting diffuse illumination in a predetermined configuration and in a predetermined direction;

(ii) illumination means for casting illumi-nation upon said illuminator means;

(iii) at least a portion of a surface of said illuminator means, when illumination from said illumination means is cast thereupon, projecting said diffuse illumination in said predetermined direction;

(e) a two-dimensional protodetector selected from the group consisting of CCD and CMOS photodetectors; having an active area, positioned at a predetermined location with respect to said optically transmissive window; and (f) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap;

(g) said focusing means comprising a focusing disk with at least twelve optical plates to provide different focal lengths, said focusing disk being rotatable so that each of said at least twelve optical plates can move into an optical path of said imager;

(h) a microprocessor for controlling said focusing means and operation of said two-dimensional photodetector, so that said two-dimensional photo-detector performs image capture for each of said at least twelve optical plates;

(i) said microprocessor controlling said two-dimensional photodetector to shift out said image data, one line at a time;

(j) said microprocessor evaluating transitions between light and dark data in a central set of said lines to produce a representative value for each of said at least twelve optical plates, wherein a largest representative value corresponds to one of said optical plates producing optimum focus.

82. The data-collection apparatus of claim 81, wherein said CCD passes substantially 246 lines through at a relatively rapid rate and said central set of lines, comprises substantially ten lines of data, that are passed at a rate slower than said relatively rapid rate, said CCD being reset thereafter.

83. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window;

(c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(d) a two-dimensional photodetector, selected from the group consisting of CCD and CMOS potodetectors, having an active area, positioned at a predetermined location with respect to said optically transmissive window;

(e) a variable focus optical system including an objective taking lens positioned with respect to said two-dimensional photodetector to image a symbology target onto said active area thereof, said objective taking lens including one or more stationary lens elements fixedly aligned along an optical axis and at least a focusing means that is rotatable about an axis offset with respect to said optical axis, said focusing means including at least two focusing zones and being moveable transversely with respect to said optical axis, to change the focus of said objective taking lens, as said focusing means rotates for selected periods, including between at least said two focusing zones, so that said objective taking lens can image over working distances that at least partially overlap; and (f) control means for controlling said focusing means and said two-dimensional photodetector to determine an optimum focus state;

(g) said focusing means being controlled by said control means to provide image data to said two-dimensional photodetector for each of said at least two focusing zones;

(h) said active area of said two-dimensional photodetector shifting out said image data one line at a time, and storing a central portion of said image data in a memory in said control means;

(i) said control means evaluating transitions between light and dark data in said central portion of said image data to produce a representative value for each of said at least two focusing zones, wherein a largest representative value indicates which of said focusing zones provides the best focus;

(j) said CCD having a resolution of 659 by 494 pixels in said active area, and being controlled to quickly pass 246 lines of data through without storing said 246 lines in memory, and said control portion of said image includes substantially ten lines of data for which said CCD is controlled to analyze at a rate slower than the rate at which said 246 lines were passed; said CCD being thereafter being controlled to be reset.

84. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window;

(c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(d) a two-dimensional photodetector, selected from the group consisting of CCD and CMOS potodetectors, having an active area, positioned at a predetermined location with respect to said optically transmissive window;

(e) a variable focus optical system including an objective taking lens positioned with respect to said two-dimensional photodetector to image a symbology target onto said active area thereof, said objective taking lens including one or more stationary lens elements fixedly aligned along an optical axis and at least a focusing means that is rotatable about an axis offset with respect to said optical axis, said focusing means including at least two focusing zones and being moveable transversely with respect to said optical axis, to change the focus of said objective taking lens, as said focusing means rotates for selected periods, including between at least said two focusing zones, so that said objective taking lens can image over working distances that at least partially overlap; and (f) control means for controlling said focusing means and said two-dimensional photodetector to determine an optimum focus state;

(g) said focusing means being controlled by said control means to provide image data to said two-dimensional photodetector for each of said at least two focusing zones;

(h) said active area of said two-dimensional photodetector shifting out said image data one line at a time, and storing a central portion of said image data in a memory in said control means;

(i) said control means evaluating transitions between light and dark data in said central portion of said image data to produce a representative value for each of said at least two focusing zones, wherein a largest representative value indicates which of said focusing zones provides the best focus;

(j) said two-dimensional photodetector being constructed to receive said image data for multiple illumination conditions, as provided by said illumination means, said control means being able to calculate edge totals for each image and optimum illumination being determined for one of said multiple illumination states having a largest edge total.—

85. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window;

(c) an elongated handle having a proximal portion coupled to a rear wall of said head to define a neck grippable by thumb and index finger of an operator and a distal end extending away from said head, said head having an exterior configuration extending rearwardly from a front end thereof and which is sized and shaped to facilitate the cupping and holding of said head by an operator;

(d) a two-dimensional photodetector, selected from the group consisting of CCD and CMOS potodetectors, having an active area, positioned at a predetermined location with respect to said optically transmissive window;

(e) a variable focus optical system including an objective taking lens positioned with respect to said two-dimensional photodetector to image a symbology target onto said active area thereof, said objective taking lens including one or more stationary lens elements fixedly aligned along an optical axis and at least a focusing means that is rotatable about an axis offset with respect to said optical axis, said focusing means including at least two focusing zones and being moveable transversely with respect to said optical axis, to change the focus of said objective taking lens, as said focusing means rotates for selected periods, including between at least said two focusing zones, so that said objective taking lens can image over working distances that at least partially overlap; and (f) control means for controlling said focusing means and said two-dimensional photodetector to determine an optimum focus state;

(g) said focusing means being controlled by said control means to provide image data to said two-dimensional photodetector for each of said at least two focusing zones;

(h) said active area of said two-dimensional photodetector shifting out said image data one line at a time, and storing a central portion of said image data in a memory in said control means;

(i) said control means evaluating transitions between light and dark data in said central portion of said image data to produce a representative value for each of said at least two focusing zones, wherein a largest representative value indicates which of said focusing zones provides the best focus;

(j) said focusing means comprising a focusing disk with at least twelve optical plates to provide different focal lengths, said focusing disk being rotatable so that each of said at least twelve optical plates can move into an optical path of said imager;

(k) a microprocessor for controlling said focusing means and operation of said two-dimensional photodetector, so that said two-dimensional photodetector performs image capture for each of predetermined number of said optical plates;

(l) said microprocessor controlling said two-dimensional photodetector to shift out said image data, one line at a time; and (m) said microprocessor being constructed to evaluate transitions between light and dark data in a central set of said lines to produce a representative value for each of said optical plates for which an image is to be captured wherein a largest representative value corresponds to one of said optical plates producing optimum focus.

86. The data-collection apparatus of claim 85, wherein said CCD passes substantially 246 lines through at a relatively rapid rate and said central set of lines, comprises substantially ten lines of data, that are passed at a rate slower than said relatively rapid rate, said CCD being reset thereafter.

87. The data-collection apparatus of claim 85 wherein said predetermined number of optical plates that are imaged are 12.

88. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a substantially lambertian illumination emitting device within said head so that such devices, when energized, will cast diffuse illumination towards and upon the symbology;

(d) providing, within the hand-held imager/reader, an objective taking lens, a two-dimensional photodetector having an active area and a rotatable focusing element;

(e) positioning said photodetector behind the objective taking lens by a predetermined distance;

(f) aiming the imager/reader so that the symbology is located within a field of view of said objective taking lens and said two-dimensional photodetector;

(g) selectively rotating said focusing element such that said focusing element moves transversely with respect to said optical axis of said objective taking lens to change the focus of said objective taking lens between at least two focusing zones so that said objective taking lens can image both linear and matrix symbologies over working distances that at least partially overlap with respect to linear and matrix symbologies;

(h) forming a series of images of the symbology via the objective taking lens, onto said two-dimensional photodetector as the focusing element rotates and determining the range separating said objective taking lens and the symbology;

(i) determining a best focusing zone of said focusing element that most sharply images the symbology in accordance with the range determined as said focusing element rotates;

(j) capturing an image of the symbology with said two-dimensional photodetector when said best focusing zone of said focusing element is in alignment with said objective taking lens;

(k) selecting said illumination emitting device to be of a predetermined size; and (l) electrically interconnecting said illumination emitting device with electrically conductive material of predetermined size and positioning said illuminating emitting device and electrically conductive material to minimize shadows upon the target and/or so that shadows thereof on the target will be out of focus and appear to be smeared when imaged.

89. The method of claim 88, wherein said focusing element is selected from a group consisting of disks comprising optical shims, helical surfaces, and analytic function elements.

90. The method of claim 89, further including determining the level of available illumination and providing an artificial source of illumination that is diffuse where symbologies are near and partially diffuse where distant with respect to said objective taking lens.

91. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a substantially lambertian illumination emitting device within said head so that such devices, when energized, will cast diffuse illumination towards and upon the symbology;

(d) providing, within the hand-held imager/reader, an objective taking lens, a two-dimensional photodetector having an active area and a rotatable disc focusing element;

(e) positioning said photodetector behind the objective taking lens by a predetermined distance;

(f) aiming the imager/reader so that the symbology is located within a field of view of said objective taking lens and said two-dimensional photodetector;

(g) selectively rotating said focusing element such that said focusing element moves transversely with respect to said optical axis of said objective taking lens to change the focus of said objective taking lens between at least two focusing zones so that said objective taking lens can image both linear and matrix symbologies over working distances that at least partially overlap with respect to linear and matrix symbologies;

(h) forming a series of images of the symbology via the objective taking lens, onto said two-dimensional photodetector as the focusing element rotates and determining the range separating said objective taking lens and the symbology;

(i) determining a best focusing zone of said focusing element that most sharply images the symbology in accordance with the range determined as said focusing element rotates;

(j) capturing an image of the symbology with said two-dimensional photodetector when said best focusing zone of said focusing element is in alignment with said objective taking lens;

(k) providing multiple illumination conditions of said symbology;

(l) capturing an image of said symbology in said active area of said two-dimensional photodetector for each of said multiple illumination conditions;

(m) determining optimum illumination by calculating edge totals for each image data received by said two-dimensional photodetector;

(n) comparing said edge total for all of said multiple illumination conditions to determine a largest edge total;

(o) utilizing said largest edge total as an indicator of optimum illumination;

(p) controlling said two-dimensional photodetector to quickly pass 246 lines of data through without storing said 246 lines in memory;

(q) including substantially ten lines of data within a contol portion of said image;

(r) controlling said two-dimensional photodetector to analyze at a rate slower than the rate of which said 246 lines are to be-passed; and (s) controlling said two-dimensional photodetector to thereafter be reset.

92. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a substantially lambertian illumination emitting device within said head so that such devices, when energized, will cast diffuse illumination towards and upon the symbology;

(d) providing, within the hand-held imager/reader, an objective taking lens, a two-dimensional photodetector having an active area and a rotatable disc focusing element;

(e) positioning said photodetector behind the objective taking lens by a predetermined distance;

(f) aiming the imager/reader so that the symbology is located within a field of view of said objective taking lens and said two-dimensional photodetector;

(g) selectively rotating said focusing element such that said focusing element moves transversely with respect to said optical axis of said objective taking lens to change the focus of said objective taking lens between at least two focusing zones so that said objective taking lens can image both linear and matrix symbologies over working distances that at least partially overlap with respect to linear and matrix symbologies;

(h) forming a series of images of the symbology via the objective taking lens, onto said two-dimensional photodetector as the focusing element rotates and determining the range separating said objective taking lens and the symbology;

(i) determining a best focusing zone of said focusing element that most sharply images the symbology in accordance with the range determined as said focusing element rotates;

(j) capturing an image of the symbology with said twodimensional photodetector when said best focusing zone of said focusing element is in alignment with said objective taking lens;

(k) providing multiple illumination conditions of said symbology;

(l) capturing an image of said symbology in said active area of said two-dimensional photodetector for each of said multiple illumination conditions;

(m) determining optimum illumination by calculating edge totals for each image data received by said two-dimensional photodetector;

(n) comparing said edge total for all of said multiple illumination conditions to determine a largest edge total;

(o) utilizing said largest edge total as an indicator of optimum illumination;

(p) said two-dimensional photodetector receiving said image data for multiple illumination conditions, as provided by said illumination apparatus means; and (q) said control means calculating edge totals for each image and determining optimum illumination for one of said multiple illumination states having a largest edge total.

93. The data-collection apparatus of claim 92, wherein said CCD passes substantially 246 lines through at a relatively rapid rate and said central set of lines, comprises substantially ten lines of data, that are passed at a rate slower than said relatively rapid rate, said CCD being reset thereafter.

94. A method of manipulating a hand-held imager/reader for imaging machine readable encoded symbology; comprising:

(a) providing the imager/reader with a head and a generally elongated handle having a proximal portion coupled to said head so as to define a neck grippable by thumb and index finger of an operator in a first gripping mode and with a distal end extending away from said head;

(b) providing said head with a leading end portion and an exterior configuration sized and shaped to facilitate cupping and holding said head by an operator in a second gripping mode;

(c) arranging a substantially lambertian illumination emitting device within said head so that such devices, when energized, will cast diffuse illumination towards and upon the symbology;

(d) providing, within the hand-held imager/reader, an objective taking lens, a two-dimensional photodetector having an active area and a rotatable disc focusing element;

(e) positioning said photodetector behind the objective taking lens by a predetermined distance;

(f) aiming the imager/reader so that the symbology is located within a field of view of said objective taking lens and said two-dimensional photodetector;

(g) selectively rotating said focusing element such that said focusing element moves transversely with respect to said optical axis of said objective taking lens to change the focus of said objective taking lens between at least two focusing zones so that said objective taking lens can image both linear and matrix symbologies over working distances that at least partially overlap with respect to linear and matrix symbologies;

(h) forming a series of images of the symbology via the objective taking lens, onto said two-dimensional photodetector as the focusing element rotates and determining the range separating said objective taking lens and the symbology;

(i) determining a best focusing zone of said focusing element that most sharply images the symbology in accordance with the range determined as said focusing element rotates;

(j) capturing an image of the symbology with said two-dimensional photodetector when said best focusing zone of said focusing element is in alignment with said objective taking lens;

(k) providing multiple illumination conditions of said symbology;

(l) capturing an image of said symbology in said active area of said two-dimensional photodetector for each of said multiple illumination conditions;

(m) determining optimum illumination by calculating edge totals for each image data received by said two-dimensional photodetector;

(n) comparing said edge total for all of said multiple illumination conditions to determine a largest edge total;

(o) utilizing said largest edge total as an indicator of optimum illumination;

(p) forming said focusing element with a plurality of optical plates to provide different focal lengths, and rotating same so that selected ones of said optical plates are moved into an optical path of said imager;

(q) providing a microprocessor for controlling said focusing element and operation of said two-dimensional photodetector, so that said two-dimensional photodetector performs image capture for said selected ones of said optical plates;

(r) said microprocessor controlling said two-dimensional detector to shift out said image data, one line at a time; and (s) said microprocessor evaluating transitions between light and dark data in a central set of said lines to produce a representative value for each of said selected ones of said optical plates, wherein a largest representative value corresponds to one of said optical plates producing optimum focus.

95. A hand-held data-collection apparatus for imaging machine readable symbology of coded information; comprising:

(a) an optical illuminating head including an optically transmissive window disposed proximate a leading end portion of said head;

(b) illumination apparatus means operable for illuminating symbology through said transmissive window; and (c) said illumination apparatus means including:

(i) illuminator means for projecting diffuse illumination in a predetermined configuration and in a predetermined direction;

(ii) illumination means for casting illumi-nation upon said illuminator means;

(iii) at least a portion of a surface of said illuminator means, when illumination from said illumination means is cast thereupon, projecting said diffuse illumination in said predetermined direction;

(d) a two-dimensional photodetector, having an active area, positioned at a predetermined location with respect to said optically transmissive window;

(e) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap;

(f) rangefinding means for determining the distance from said variable focus optical system to an object to be imaged and providing a ranging signal that varies in correspondence with object distance;

(g) control means for controlling said focusing means and said two-dimensional photodetector to determine an optimum focus state;

(h) said focusing means being controlled by said control means to provide image data to said two-dimensional photodetector for each of said at least two focusing zones;

(i) said active area of said two-dimensional photodetector shifting out said image data one line at a time, and storing a selected portion, or selected portions, of said image data in a memory in said control means;

(j) said control means evaluating transitions between light and dark data in said selected portion or portions of said image data to produce a representative value for each of said at least two focusing zones, wherein a largest representative value indicates which of said focusing zones provides the best focus;

(k) said two-dimensional photodetector including a CCD with a resolution of 659 by 494 pixels in said active area; and (l) said CCD being controllable to quickly pass 246 lines of data through without storing said 246 lines in memory, with said control portion of said image to include substantially ten lines of data for which said CCD is to be controlled to analyze at a rate slower than the rate at which said 246 lines were passed; said CCD being thereafter controlled to be reset.

96. A hand-held data-collection apparatus for imaging machine readable symbology of coded information; comprising:

(a) an optical illuminating head including an optically transmissive window disposed proximate a leading end portion of said head;

(b) illumination apparatus means operable for illieinating symbology through said transmissive window; and (c) said illumination apparatus means including:
  (i) illuminator means for projecting diffuse illumination in a predetermined configuration and in a predetermined direction;
  (ii) illumination means for casting illumi-nation upon said illuminator means;
  (iii) at least a portion of a surface of said illuminator means, when illumination from said illumination means is cast thereupon, projecting said diffuse illumination in said predetermined direction;
(d) a two-dimensional photodetector, having an active area, positioned at a predetermined location with respect to said optically transmissive window;
(e) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap;
(f) rangefinding means for determining the distance from said variable focus optical system to an object to be imaged and providing a ranging signal that varies in correspondence with object distance;
(g) control means for controlling said focusing means and said two-dimensional photodetector to determine an optimum focus state;
(h) said focusing means being controlled by said control means to provide image data to said two-dimensional photodetector for each of said at least two focusing zones;
(i) said active area of said two-dimensional photodetector shifting out said image data one line at a time, and storing a selected portion, or selected portions, of said image data in a memory in said control means;
(j) said control means evaluating transitions between light and dark data in said selected portion or portions of said image data to produce a representative value for each of said at least two focusing zones, wherein a largest representative value indicates which of said focusing zones provides the best focus;
(k) said two-dimensional photodetector is to receive said image data for multiple illumination conditions, as provided by said illumination means; and
(l) said control means is to calculate edge totals for each image and optimum illumination is determined for one of said multiple illumination states having a largest edge total.—

97. A hand-held data-collection apparatus for imaging machine readable symbology of coded information; comprising:
(a) an optical illuminating head including an optically transmissive window disposed proximate a leading end portion of said head;
(b) illumination apparatus means operable for illuminating symbology through said transmissive window; and
(c) said illumination apparatus means including:
  (i) illuminator means for projecting diffuse illumination in a predetermined configuration and in a predetermined direction;
  (ii) illumination means for casting illumi-nation upon said illuminator means;
  (iii) at least a portion of a surface of said illuminator means, when illumination from said illumination means is cast thereupon, projecting said diffuse illumination in said predetermined direction;
(d) a two-dimensional photodetector, having an active area, positioned at a predetermined location with respect to said optically transmissive window;
(e) a variable focus optical system including an objective taking lens positioned with respect to said two-dimensional photodetector to image a symbology target on said active area thereof, said objective taking lens including one or more stationary lens elements fixedly aligned along an optical axis and at least a focusing means that is rotatable about an axis offset with respect to said optical axis, said focusing means being moveable transversely with respect to said optical axis, to change the focus of said objective taking lens, as said focusing means rotates for selected periods, between at least two focusing zones, so that said objective taking lens can image over working distances that at least partially overlap;
(f) rangefinding means for determining the distance from said variable focus optical system to an object to be imaged and providing a ranging signal that varies in correspondence with object distance;
(g) control means for controlling said focusing means and said two-dimensional photodetector to determine an optimum focus state;
(h) said focusing means being controlled by said control means to provide image data to said two-dimensional photodetector for each of said at least two focusing zones;
(i) said active area of said two-dimensional photodetector shifting out said image data one line at a time, and storing a selected portion, or selected portions, of said image data in a memory in said control means;
(j) said control means evaluating transitions between light and dark data in said selected portion or portions of said image data to produce a representative value for each of said at least two focusing zones, wherein a largest representative value indicates which of said focusing zones provides the best focus;
(k) said focusing means comprising a focusing disk with at least twelve optical plates to provide different focal lengths, said focusing disk being rotatable so that each of said at least twelve optical plates can move into an optical path of said imager;
(l) a microprocessor for controlling said focusing means and operation of said two-dimensional photodetector, so that said two-dimensional photodetector performs image capture for each of said at least twelve optical plates;
(m) said microprocessor controlling said two-dimensional photodetector to shift out said image data, one line at a time; and
(n) said microprocessor evaluating transitions between light and dark data in a selected set of said lines to produce a representative value for each of said at least twelve optical plates, wherein a largest representative value corresponds to one of said optical plates producing optimum focus.

98. The data-collection apparatus for imaging machine readable symbology of coded information, comprising;

(a) a housing;

(b) an optically transmissive window carried by said housing;

(c) illuminating apparatus disposed within said housing and positioned therein to project diffuse illumination through said window and towards symbology when disposed within the vicinity of said window;

(d) a two-dimensional photodetector, having an active area, positioned at a predetermined location with respect to said window;

(e) a variable focus optical system having an optical axis and including a focusing means that is rotatable about a focusing axis that is offset with respect to said optical axis and movable transversely, with respect to said optical axis, to change the focus of said variable focus optical system as said focusing means rotates for selected periods between at least two focusing zones of said focusing means, so that said variable focus optical system can image the symbology over predetermined working distances;

(f) said focusing means including a plurality of optical plates, each of different thickness, to change the optical path length of said variable focus optical system so that symbology positioned at different locations within the field of view of said variable focus optical system will be acceptably imaged on said active area of said two-dimensional photodetector;

(g) control means for controlling said focusing means and said two-dimensional photodetector to determine an optimum focus;

(h) said control means controlling said focusing means to provide image data to said two-dimensional photodetector for each of said at least two focusing zones;

(i) said active area of said two-dimensional photodetector shifting out said image data one line at a time, and storing a selected portion of said image data in a memory in said control means;

(j) said control means evaluating transitions between light and dark data in said selected portion of said image data for, producing a representative value for each of said at least two focusing zones, wherein a largest representation value indicates which of said focusing zones provides the best focus;

(k) said two-dimensional photodetector including a CCD with a resolution of 659 lines by 494 pixels in said active area; and (l) said CCD is to be controlled to pass said selected portion of said image data to a memory at a first predetermined rate and to effectively dump the rest of the image data at a dump rate which is faster then said first predetermined rate.

99. The data-collection apparatus of claim 98, wherein said CCD is further controlled to be reset to facilitate dumping at least some of said image data.

100. The data-collection apparatus of claim 99, wherein said selected portion of said image data is selected from at least a central portion of said two-dimensional photodetector.

101. The data-collection apparatus of claim 100, wherein said selected portion-of said image data is selected from portions of said image date at spaced locations in said two-dimensional photodetector.

102. The data-collection apparatus of claim 101, wherein said two-dimensional photodetector receives data from at least twelve focusing zones positioned on said focusing means.

* * * * *